US010257337B2

(12) United States Patent
Harada et al.

(10) Patent No.: US 10,257,337 B2
(45) Date of Patent: Apr. 9, 2019

(54) COMMUNICATION APPARATUS CONNECTABLE WITH USE OF CLOSE PROXIMITY WIRELESS COMMUNICATION, METHOD FOR CONTROLLING COMMUNICATION APPARATUS, AND RECORDING MEDIUM

(71) Applicant: CANON KABUSHIKI KAISHA, Tokyo (JP)

(72) Inventors: Sayaka Harada, Saitama (JP); Yuji Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/503,573

(22) PCT Filed: Jul. 31, 2015

(86) PCT No.: PCT/JP2015/003878
§ 371 (c)(1),
(2) Date: Feb. 13, 2017

(87) PCT Pub. No.: WO2016/027424
PCT Pub. Date: Feb. 25, 2016

(65) Prior Publication Data
US 2017/0244824 A1 Aug. 24, 2017

(30) Foreign Application Priority Data
Aug. 18, 2014 (JP) ................................ 2014-165971

(51) Int. Cl.
*G06F 3/14* (2006.01)
*H04M 1/725* (2006.01)
(Continued)

(52) U.S. Cl.
CPC ............ *H04M 1/7253* (2013.01); *G06F 3/14* (2013.01); *G06F 3/1423* (2013.01);
(Continued)

(58) Field of Classification Search
CPC ........... H04M 1/7253; H04M 2250/04; H04M 2250/06; G06F 3/1423; H04W 76/023; H04W 76/064
See application file for complete search history.

(56) References Cited

U.S. PATENT DOCUMENTS

2004/0090543 A1* 5/2004 Suehiro ............. H04N 1/00265
348/231.99
2004/0189809 A1* 9/2004 Choi ................. H04N 1/00204
348/207.1
(Continued)

FOREIGN PATENT DOCUMENTS

JP 2000333119 A 11/2000
JP 2002125143 A 4/2002
(Continued)

*Primary Examiner* — Qun Shen
(74) *Attorney, Agent, or Firm* — Canon U.S.A., Inc. IP Division

(57) ABSTRACT

A communication apparatus includes a communication unit configured to communicate with an external apparatus, and a control unit having a plurality of display modes including a single-display mode of displaying a single content on a single screen of a display unit, and a multi-display mode of displaying a plurality of contents on the single screen of the display unit, wherein, if the communication unit starts communication with the external apparatus in a state where the display mode is the multi-display mode, the control unit displays the plurality of contents on the single screen of the display unit and receives a selection of a transmission target after establishment of the communication with the external apparatus, and wherein, if the communication unit starts the communication with the external apparatus in a state where the display mode is the single-display mode, the control unit does not receive the selection of the transmission target after the establishment of the communication with the external apparatus.

19 Claims, 12 Drawing Sheets

(51) Int. Cl.

| | |
|---|---|
| ***H04W 76/14*** | (2018.01) |
| ***H04W 76/34*** | (2018.01) |
| *H04W 84/12* | (2009.01) |
| *H04W 88/06* | (2009.01) |

(52) U.S. Cl.

CPC ........... *H04W 76/14* (2018.02); *H04W 76/34* (2018.02); *G09G 2370/025* (2013.01); *G09G 2370/04* (2013.01); *G09G 2370/16* (2013.01); *H04M 2250/04* (2013.01); *H04M 2250/06* (2013.01); *H04W 84/12* (2013.01); *H04W 88/06* (2013.01)

(56) References Cited

U.S. PATENT DOCUMENTS

2007/0109598 A1* 5/2007 Clark ................ G06F 17/30274 358/1.16
2010/0079619 A9* 4/2010 Ward ................. H04N 1/00132 348/231.3
2010/0277601 A1* 11/2010 Shiohara ................. G06T 9/007 348/207.2
2012/0205192 A1* 8/2012 Bornert-Dano ........... B64F 5/00 181/294
2015/0296077 A1* 10/2015 Wakeyama ...... G08B 13/19684 455/414.1

FOREIGN PATENT DOCUMENTS

| | | | |
|---|---|---|---|
| JP | 2006287494 | A | 10/2006 |
| JP | 2010041334 | A | 2/2010 |
| JP | 2012205192 | A | 10/2012 |
| JP | 2013157736 | A | 8/2013 |
| JP | 2013251873 | A | 12/2013 |
| WO | 2013/111537 | A1 | 8/2013 |
| WO | 2014103314 | A1 | 7/2014 |

* cited by examiner

COMMUNICATION APPARATUS CONNECTABLE WITH USE OF CLOSE PROXIMITY WIRELESS COMMUNICATION, METHOD FOR CONTROLLING COMMUNICATION APPARATUS, AND RECORDING MEDIUM

TECHNICAL FIELD

The present invention relates to a communication apparatus connectable to an external apparatus with use of close proximity wireless communication.

BACKGROUND ART

In recent years, there has been being known a digital camera capable of connecting to a mobile phone via a wireless local area network (LAN) and transmitting/receiving image data to/from the mobile phone. Further, to omit a part of an operation procedure that a user has to perform for this connection via the wireless communication, there has been known a technique for sharing a communication parameter for connecting to the mobile phone via the wireless communication with use of other wireless communication (so-called handover). For example, PTL 1 discusses that a communication parameter for connecting apparatuses to each other via a wireless LAN is shared between the apparatuses with use of Near Field Communication (NFC).

CITATION LIST

Patent Literature

PTL 1: Japanese Patent Application Laid-Open No. 2013-157736

SUMMARY OF INVENTION

Technical Problem

However, while the technique discussed in PTL 1 allows a user to connect the apparatuses to each other by an intuitive operation, a procedure for transmitting an image itself is not taken into any consideration in this technique. Generally, a selection of the image to be transmitted via the wireless LAN requires an operation for shifting a screen to a screen that is used to transmit/receive the image after the apparatuses are connected to each other. Therefore, the conventional procedure for transmitting the image cannot be necessarily said to be intuitive, and the user may feel inconvenient compared to the connection procedure that is now simplified by the handover technique.

Therefore, the present invention is directed to further simplifying a procedure for selecting the image to be transmitted after the handover.

Solution to Problem

According to an aspect of the present invention, a communication apparatus includes a communication unit configured to communicate with an external apparatus, an acquisition unit configured to acquire a plurality of contents from a recording medium, and a control unit having a plurality of display modes including a single-display mode of displaying a single content recorded in the recording medium on a single screen of a display unit, and a multi-display mode of displaying a plurality of contents recorded in the recording medium on the single screen of the display unit, wherein, if the communication unit starts communication with the external apparatus in a state where the display mode is the multi-display mode, the control unit displays the plurality of contents recorded in the recording medium on the single screen of the display unit and receives a selection of a transmission target after establishment of the communication with the external apparatus, and wherein, if the communication unit starts the communication with the external apparatus in a state where the display mode is the single-display mode, the control unit does not receive the selection of the transmission target after the establishment of the communication with the external apparatus.

Further features of the present invention will become apparent from the following description of exemplary embodiments with reference to the attached drawings.

DESCRIPTION OF EMBODIMENTS

In the following description, exemplary embodiments for embodying the present invention will be described in detail with reference to the attached drawings.

Each of the exemplary embodiments that will be described below is merely one example as a method for realizing the present invention, and may be modified or changed as necessary according to a configuration of an apparatus to which the present invention is applied, and various kinds of conditions. Further, the individual exemplary embodiments can be combined to each other as necessary.

First Exemplary Embodiment

<Configuration of Digital Camera>

Figure 1A:
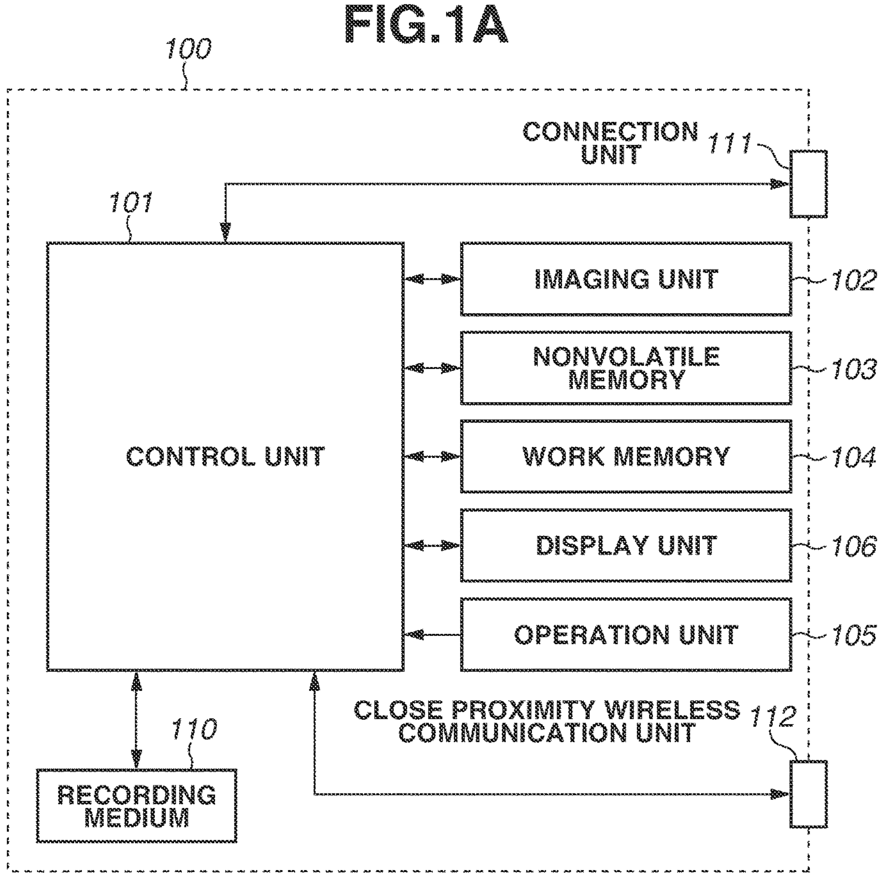
FIG. 1A is a block diagram illustrating a digital camera according to a first exemplary embodiment.

FIG. 1A is a block diagram illustrating an exemplary configuration of a digital camera 100, which is one example of a communication apparatus according to the present exemplary embodiment. In the present exemplary embodiment, the digital camera will be described as one example of the communication apparatus, but the communication apparatus is not limited to this example. For example, the communication apparatus may be an information processing apparatus such as a portable media player, a so-called tablet device, and a personal computer.

A control unit 101 controls each of units of the digital camera 100 according to an input signal and a program that will be described below. Instead of the control unit 101 controlling the entire apparatus, a plurality of hardware devices may control the entire apparatus by sharing processing among them.

An imaging unit 102 includes, for example, an optical system that controls an optical lens unit, a diaphragm, zooming, focusing, and the like, and an image sensor for converting light (a video image) input via the optical lens unit into an electric video signal. Generally, a complementary metal oxide semiconductor (CMOS) sensor or a charge coupled device (CCD) sensor is used as the image sensor. By being controlled by the control unit 101, the imaging unit 102 converts light of an object focused by a lens included in the imaging unit 102 into the electric signal by the image sensor, performs noise reduction processing and the like, and outputs digital data as image data. In the digital camera 100 according to the present exemplary embodiment, the image data is recorded into a recording medium 110 in compliance with the Design Rule for Camera File system (DCF) standard.

A nonvolatile memory 103 is an electrically erasable and recordable nonvolatile memory, and stores, for example, a program to be executed by the control unit 101, which will be described below.

A work memory 104 is used as a buffer memory that temporarily stores the image data captured by the imaging unit 102, a memory for an image display by a display unit 106, a work area of the control unit 101, and the like.

An operation unit 105 is used to receive an instruction issued by a user to the digital camera 100. The operation unit 105 includes, for example, a power button that allows the user to instruct the digital camera 100 to be powered on and off, a release switch that allows the user to instruct the digital camera 100 to capture an image, a zoom lever that allows the user to adjust a focal length, and a reproduction button that allows the user to instruct the digital camera 100 to reproduce the image data. Further, the operation unit 105 includes an operation member such as a dedicated connection button that allows the user to start communication with an external apparatus via a connection unit 111, which will be described below. Further, the operation unit 105 also includes a touch panel formed on the display unit 106, which will be described below. The release switch has a switch SW1 and a switch SW2. When the release switch is set into a so-called half-pressed state, the switch SW1 is switched on. With this operation, the digital camera 100 receives an instruction for performing preparations for imaging, such as automatic focus (AF) processing, automatic exposure (AE) processing, automatic white balance (AWB) processing, and electronic flash preliminary emission (EF) processing. Further, when the release switch is set into a so-called full-pressed state, the switch SW2 is switched on. With this operation, the digital camera 100 receives an instruction for capturing the image.

The display unit 106, for example, displays an image for a viewfinder at the time of the imaging, the captured image data, and characters for an interactive operation. The display unit 106 does not necessarily have to be built in the digital camera 100. The display unit 106 may be provided to the digital camera 100 in any manner, as long as the digital camera 100 can be connected to the display unit 106 internally mounted or externally prepared, and has at least a display control function of controlling the display of the display unit 106.

The digital camera 100 according to the present exemplary embodiment has an imaging mode, in which the digital camera 100 captures an image, and a reproduction mode (a display mode), in which the digital camera 100 displays an image on the display unit 106. The image displayed in the reproduction mode is an image reproduced by reading out and displaying the image recorded in the recording medium 110, which will be described below. The image recorded in the recording medium 110 is not limited to only the image captured by the imaging unit 102. The image recorded in the recording medium 110 may include, for example, an image recorded by detaching the recording medium 110 from the digital camera 100, attaching the recording medium 110 to another apparatus, and capturing the image by the other apparatus, and may include, for example, an image received from the external apparatus via the connection unit 111, which will be described below.

Further, in the reproduction mode, the digital camera 100 has the following two sub modes. These sub modes are a single-reproduction mode (a single-display mode), in which the digital camera 100 displays a single image on a single screen of the display unit 106, and a multi-reproduction mode (a multi-display mode), in which the digital camera 100 displays a plurality of images on the single screen of the display unit 106. The number of images displayed in the multi-reproduction mode can be switched by a user's operation. For example, 3×3 images, i.e., 9 images in total can be displayed, or 5×5 images, i.e., 25 images in total can be displayed by an operation performed on a dial included in the operation unit 105. The zoom lever may be also used for this switching of the number of images displayed in the multi-reproduction mode. For example, the digital camera 100 may be configured in such a manner that more images are displayed when the zoom lever is operated toward a telephoto side, and fewer images are displayed when the zoom lever is operated toward a wide side. This configuration allows the digital camera 100 to provide a more intuitive operational feeling. In a case where the zoom lever is operated toward the telephoto side when the number of displayed images has already reached a predetermined number, the digital camera 100 shifts from the multi-reproduction mode to the single-reproduction mode. The opposite is also true.

The recording medium 110 can record the image data output from the imaging unit 102. The recording medium 110 may be configured to be attachable to and detachable from the digital camera 100, or may be built in the digital camera 100. In other words, the recording medium 110 may be provided to the digital camera 100 in any manner, as long as the digital camera 100 has at least a measure for accessing the recording medium 110.

The connection unit 111 is an interface for connecting to the external apparatus. The digital camera 100 according to the present exemplary embodiment can exchange data with the external apparatus via the connection unit 111. For example, the digital camera 100 can transmit the image data generated by the imaging unit 102 to the external apparatus via the connection unit 111. In the present exemplary embodiment, the connection unit 111 includes an interface for communicating with the external apparatus via a so-called wireless LAN in compliance with the Institute of Electrical and Electronics Engineers (IEEE) 802.11 standard. The control unit 101 realizes the wireless communication with the external apparatus by controlling the connection unit 111. The communication method is not limited to the wireless LAN, and includes, for example, an infrared data communication method. The connection unit 111 is one example of a first wireless communication unit.

A close proximity wireless communication unit 112 includes, for example, an antenna for wireless communication, a modulation and demodulation circuit for processing a wireless signal, and a communication controller. The close proximity wireless communication unit 112 realizes noncontact close proximity communication by outputting the modulated wireless signal form the antenna, and demodulating the wireless signal received by the antenna. For example, the close proximity wireless communication unit 112 realizes the noncontact close proximity communication in compliance with the International Organization for Standardization (ISO)/International Electrotechnical Commission (IEC) 18092 standard (so-called NFC). The close proximity wireless communication unit 112 in the present exemplary embodiment is mounted on the side of the digital camera 100.

Placing the respective close proximity wireless communication units in close proximity to each other causes the digital camera 100 to start the communication with and be connected to a mobile phone 200, which will be described below. When the digital camera 100 and the mobile phone 200 are connected to each other with use of the close proximity wireless communication units, the close proximity wireless communication units do not necessarily have to be brought into contact with each other. The close proximity wireless communication units can communicate with each other even when they are spaced apart from each other by a predetermined distance. Therefore, the close proximity wireless communication units only have to be moved close to each other until they are located within a range that allows them to perform the close proximity wireless communication therebetween, to connect the respective apparatuses to each other. In the following description, a phrase "placing the close proximity wireless communication units in close proximity to each other" will be also used to refer to this operation of moving the close proximity wireless communication units close to each other until they are located within the range that allows them to perform the close proximity wireless communication therebetween. Further, a term "NFC touch" will be also used as this meaning to prioritize how easily this operation can be visualized in mind.

Further, the communication is not started, if the respective close proximity wireless communication units are located within a range that does not allow them to perform the close proximity wireless communication therebetween. Further, the communication connection is disconnected, if the close proximity wireless communication unit 112 and a close proximity communication unit 212 of the mobile phone 200 are moved away from each other into the range that does not allow them to perform the close proximity wireless communication. The noncontact close proximity communication realized by the close proximity wireless communication unit 112 is not limited to NFC, and another wireless communication may be employed. For example, noncontact close proximity communication in compliance with the ISO/IEC 14443 standard may be employed as the noncontact close proximity communication realized by the close proximity wireless communication unit 112.

In the present exemplary embodiment, a communication speed of the communication realized by the communication unit 111 is faster than a communication speed of the communication realized by the close proximity wireless communication unit 112, which will be described below. Further, a communicable range of the communication realized by the connection unit 111 is wider than a communicable range of the communication realized by the close proximity wireless communication unit 112. Instead thereof, the communication realized by the close proximity wireless communication unit 112 allows a communication partner to be limited due to its narrow communicable range, and therefore does not require processing such as an exchange of an encryption key that is necessary for the communication realized by the connection unit 111. In other words, the digital camera 100 can more easily communicate with the external apparatus by using the close proximity wireless communication unit 112 than by using the connection unit 111.

The connection unit 111 of the digital camera 100 according to the present exemplary embodiment has an access point (AP) mode, in which the digital camera 100 operates as an access point in the infrastructure mode, and a client (CL) mode, in which the digital camera 100 operates as a client in the infrastructure mode. Then, the digital camera 100 according to the present exemplary embodiment can operate as a CL apparatus in the infrastructure mode by causing the connection unit 111 to operate in the CL mode. When the digital camera 100 operates as the CL apparatus, the digital camera 100 can participate in a network created by an AP apparatus by connecting to the AP apparatus existing around the digital camera 100. Further, the digital camera 100 according to the present exemplary embodiment can also operate as a simplified AP that is one type of AP but is more functionally limited (hereinafter referred to as a simple AP), by causing the connection unit 111 to operate in the AP mode. When the digital camera 100 operates as the simple AP, the digital camera 100 creates a network by itself. This allows an apparatus existing around the digital camera 100 to recognize the digital camera 100 as the AP apparatus, and participate in the network created by the digital camera 100. Assume that a program for causing the digital camera 100 to operate in the above-described manner is stored in the nonvolatile memory 103.

The digital camera 100 according to the present exemplary embodiment is one type of AP, but is the simple AP that does not have a gateway function of transferring data received from the CL apparatus to an Internet provider or the like. Therefore, even when receiving data from another apparatus participating in the network created by the digital camera 100, the digital camera 100 cannot transfer this received data to a network such as the Internet.

Figure 1B:
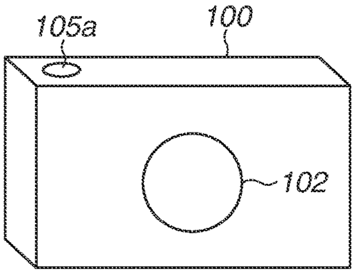
FIG. 1B illustrates an outer appearance of the digital camera according to the first exemplary embodiment.
Figure 1C:
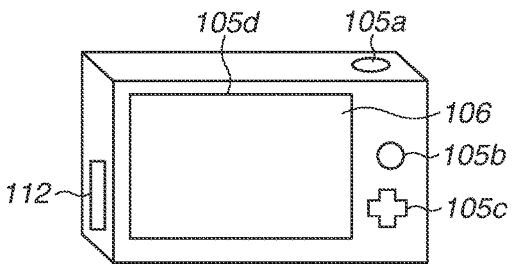
FIG. 1C illustrates an outer appearance of the digital camera according to the first exemplary embodiment.

Next, an outer appearance of the digital camera 100 will be described. FIGS. 1B and 1C illustrate one example of the outer appearance of the digital camera 100. A release switch 105*a*, a reproduction button 105*b*, a direction key 105*c*, and a touch panel 105*d* are operation members included in the above-described operation unit 105. Further, the image acquired as a result of the imaging by the imaging unit 102 is displayed on the display unit 106. Further, the digital camera 100 according to the present exemplary embodiment includes the antenna portion of the close proximity wireless communication unit 112 on a side surface of a camera housing. The user can establish the close proximity wireless communication between the digital camera 100 and the other apparatus by moving these close proximity wireless communication units 112 close to each other until they are located only a predetermined distance away from each other. This configuration allows the digital camera 100 to perform communication in a contactless manner without being connected via a cable or the like, and limit the communication partner according to a user's intention.

This is all the description about the digital camera 100.

<Internal Configuration of Mobile Phone 200>

Figure 2:
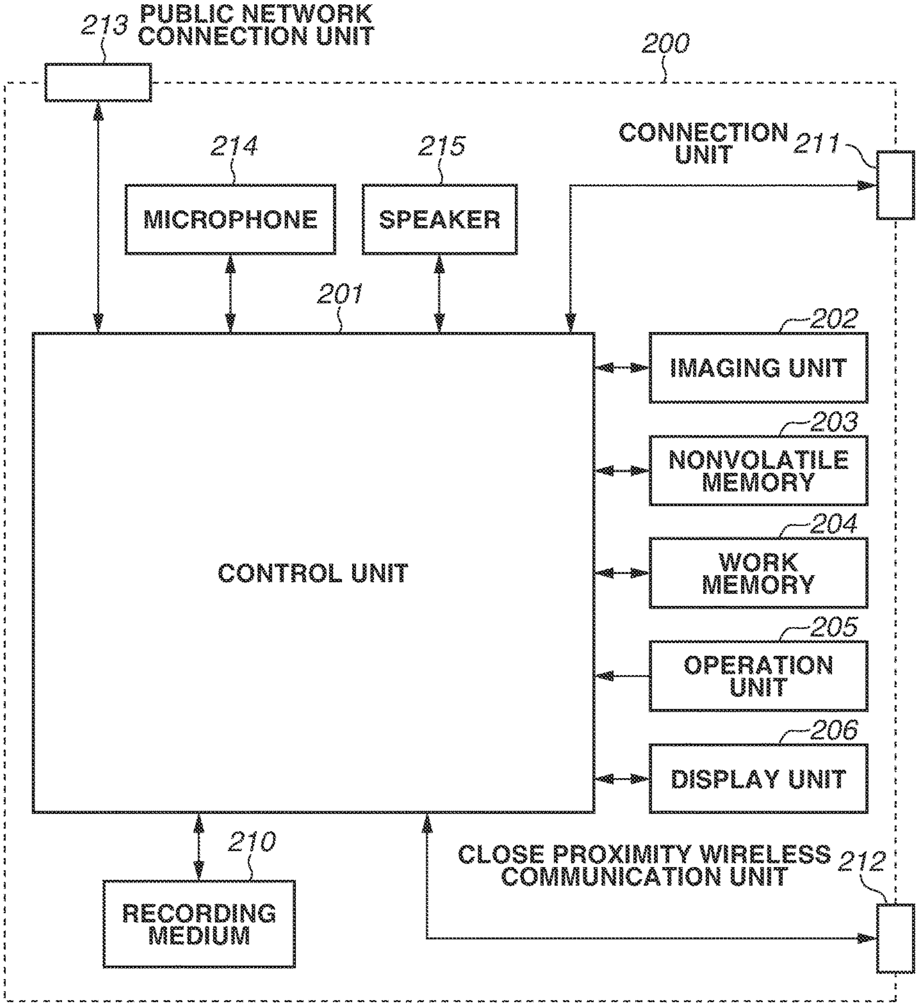
FIG. 2 is a block diagram illustrating a configuration of a mobile phone according to the first exemplary embodiment.

FIG. 2 is a block diagram illustrating an example configuration of the mobile phone 200, which is one example of an information processing apparatus according to the present exemplary embodiment. In the present exemplary embodiment, the mobile phone will be described as one example of the information processing apparatus, but the information processing apparatus is not limited to this example. For example, the information processing apparatus may be a digital camera equipped with a wireless communication function, a tablet device, a personal computer, or the like.

A control unit 201 controls each of units of the mobile phone 200 according to an input signal and a program that will be described below. Instead of the control unit 201 controlling the entire apparatus, a plurality of hardware devices may control the entire apparatus by sharing processing among them.

An imaging unit 202 converts light of an object focused by a lens included in the imaging unit 202 into an electric signal, performs noise reduction processing and the like, and outputs digital data as image data. After being stored in a buffer memory, the captured image data is subjected to a predetermined calculation by the control unit 201, and is recorded into a recording medium 210.

A nonvolatile memory 203 is an electrically erasable and recordable nonvolatile memory. The nonvolatile memory 203 records an operating system (OS), which is basic software to be executed by the control unit 201, and an application that realizes an applicative function in cooperation with this OS. Further, in the present exemplary embodiment, the nonvolatile memory 203 stores an application for communicating with the digital camera 100.

A work memory 204 is used as a memory for an image display by a display unit 206, a work area of the control unit 201, and the like.

An operation unit 205 is used to receive an instruction to the mobile phone 200 from the user. The operation unit 205 includes an operation member such as a power button that allows the user to instruct the mobile phone 200 to be powered on and off, and a touch panel formed on the display unit 206.

The display unit 206, for example, displays the image data, and characters for an interactive operation. The display unit 206 does not necessarily have to be included in the mobile phone 200. The display unit 206 may be provided to the mobile phone 200 in any manner, as long as the mobile phone 200 can be connected to the display unit 206, and has at least a display control function of controlling the display of the display unit 206.

The recording medium 210 can record the image data output from the imaging unit 202. The recording medium 210 may be configured to be attachable to and detachable from the mobile phone 200, or may be built in the mobile phone 200. In other words, the recording medium 210 may be provided to the mobile phone 200 in any manner, as long as the mobile phone 200 has at least a measure for accessing the recording medium 210.

A connection unit 211 is an interface for connecting to an external apparatus. The mobile phone 200 according to the present exemplary embodiment can exchange data with the digital camera 100 via the connection unit 211. In the present exemplary embodiment, the connection unit 211 is an antenna, and the control unit 201 can be connected to the digital camera 100 via the antenna. The control unit 201 may be connected to the digital camera 100 directly, or may be connected to the digital camera 100 via an access point. For example, Picture Transfer Protocol over Internet Protocol (PTP/IP) via the wireless LAN can be used as a protocol for communication to exchange the data. The communication with the digital camera 100 is not limited to this example. For example, the connection unit 211 can include a wireless communication module such as an infrared data communication module, a Bluetooth (registered trademark) communication module, and a Wireless Universal Serial Bus (USB). Further, a wired connection, such as a USB cable. High-Definition Multimedia Interface (HDMI) (registered trademark) cable, and IEEE 1394 cable, may be employed.

A close proximity wireless communication unit 212 is a communication unit for realizing noncontact close proximity communication with another apparatus. The close proximity wireless communication unit 212 includes an antenna for the wireless communication, a modulation and demodulation circuit for processing a wireless signal, and a communication controller. The close proximity wireless communication unit 212 realizes the noncontact close proximity communication by outputting the modulated wireless signal from the antenna, and demodulating the wireless signal received by the antenna. In the present exemplary embodiment, the close proximity wireless communication unit 212 realizes the noncontact communication in compliance with the ISO/IEC 18092 standard (so-called NFC). Upon receiving a request to read out data from the other device, the close proximity wireless communication unit 212 outputs response data based on the data stored in the nonvolatile memory 203. In the present exemplary embodiment, the mobile phone 200 operates in the card reader mode, the card writer mode, and the peer-to-peer (P2P) mode defined in the NFC standard, and mainly acts as an Initiator via the close proximity wireless communication unit 212. On the other hand, the digital camera 100 mainly acts as a Target via the close proximity wireless communication unit 112.

A public network connection unit 213 is an interface used when public wireless communication is performed. The mobile phone 200 can make and receive a phone call to and from another apparatus via the public network connection unit 213. At this time, the control unit 201 realizes the phone call by inputting and outputting a voice signal via a microphone 214 and a speaker 215. In the present exemplary embodiment, the public network connection unit 213 is an antenna, and the control unit 101 can be connected to a public network via the antenna. The connection unit 211 and the public network connection unit 213 can be configured to share a single antenna as their respective antennas.

This is all the description about the mobile phone 200.

<Image Transmission Procedure via Manual Connection>

First, a procedure for establishing the wireless LAN connection by individually operating the digital camera 100 and the mobile phone 200, and transmitting an image or images will be described with reference to FIGS. 3A and 5.

Figure 3A:
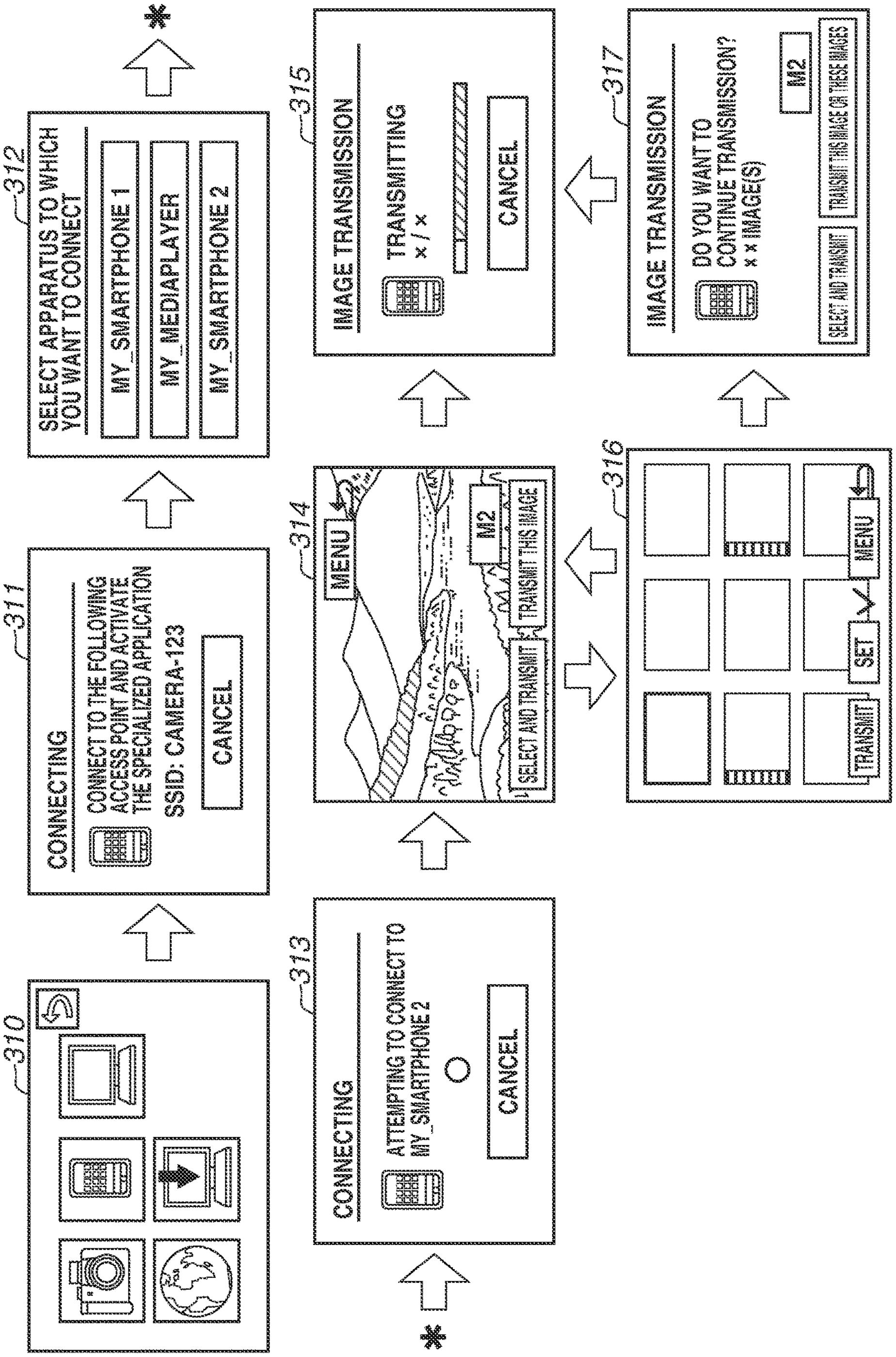
FIG. 3A illustrates a screen transition during a manual connection of the digital camera according to the first exemplary embodiment.

FIG. 3A illustrates a transition of a screen displayed on the display unit 106 of the digital camera 100. First, the user causes the digital camera 100 to display a screen 310 illustrated in FIG. 3A by operating a menu via the operation unit 105 of the digital camera 100. This screen 310 is a screen for causing the digital camera 100 to start processing for establishing the wireless LAN connection with another apparatus, and prompts the user to first select what type of apparatus the user wants to connect to. This is because the connection procedure is different for each type of apparatus. For example, if the user selects an upper left icon representing a camera on the screen 310, the digital camera 100 starts processing for establishing the wireless LAN connection with another digital camera. If the user selects an upper right icon representing a personal computer (PC), the digital camera 100 starts processing for establishing the wireless LAN connection with a PC. Then, if the user selects an upper central ion representing a mobile phone, the digital camera 100 starts processing for establishing the wireless LAN connection with a mobile phone.

Figure 5:
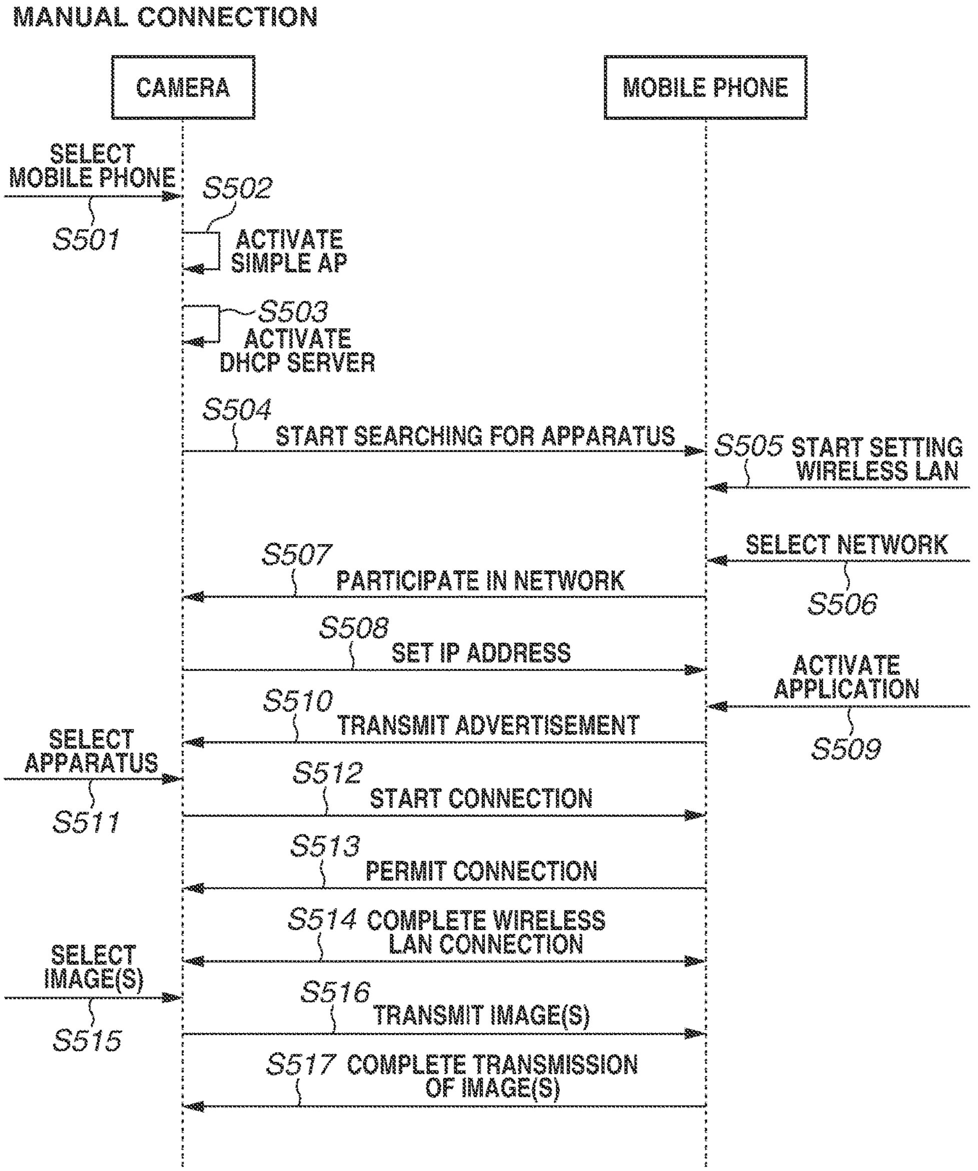
FIG. 5 is a sequence diagram illustrating the manual connection between the digital camera and the mobile phone according to the first exemplary embodiment.

A sequence illustrated in FIG. 5 is started in this state.

First, in step S501, the digital camera 100 receives a selection of the icon representing a mobile phone on the screen 310 illustrated in FIG. 3A.

In response thereto, in step S502, the digital camera 100 activates the simple AP and starts transmitting a beacon, thereby creating a network. Along therewith, the screen displayed on the display unit 106 shifts to a screen 311 illustrated in FIG. 3A. A service set identifier (SSID) of the network created with use of the simple AP function is displayed on the screen 311. In the present example, assume that an SSID “Camera-123” is set. Further, guidance for an operation that the user should perform on the mobile phone 200 side is also displayed on the screen 311 together with the SSID.

In step S503, the digital camera 100 activates a Dynamic Host Configuration Protocol (DHCP) server.

Further, in step S504, the digital camera 100 starts searching for any apparatus existing in the network.

On the other hand, in step S505, the mobile phone 200 receives an instruction to start setting the wireless LAN of the mobile phone 200. The process of this step is performed according to control by the OS of the mobile phone 200.

According to this instruction, the mobile phone 200 receives beacons of wireless LANs existing around the mobile phone 200, and makes a list of SSIDs contained in the received beacons as networks existing around the mobile phone 200. A screen 410 illustrated in FIG. 4 indicates one example of this screen. The user can input an instruction for causing the mobile phone 200 to participate in the network of the digital camera 100 by selecting the same SSID as the SSID displayed on the digital camera 100 side in step S502 from the SSIDs listed on this screen 410.

Figure 4:
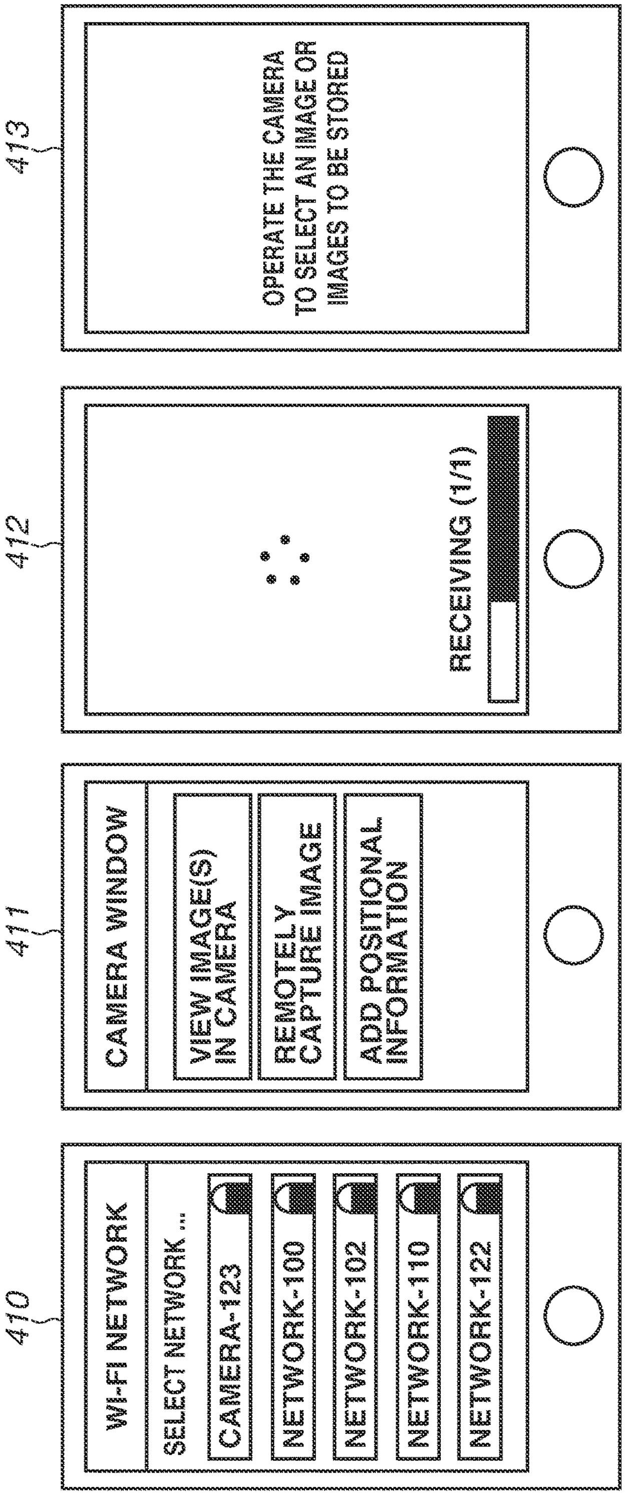
FIG. 4 illustrates examples of screens of the mobile phone according to the first exemplary embodiment.

In step S506, the user selects the SSID of the network of the digital camera 100 (“Camera-123” in the example of the screen 410 illustrated in FIG. 4). Then, in step S507, the mobile phone 200 participates in the network of the digital camera 100. More specifically, the mobile phone 200 transmits a participation request for requesting participation in the network of the digital camera 100. This request contains, for example, a probe request. Then, the digital camera 100 transmits a signal indicating permission for the participation to the mobile phone 200 in response to this request, by which the mobile phone 200 participates in the network of the digital camera 100.

Next, in step S508, the digital camera 100 sets an Internet Protocol (IP) address to the mobile phone 200 with use of the DHCP server function.

On the other hand, in step S509, the mobile phone 200 activates a specialized application according to a user’s instruction.

In step S510, the mobile phone 200 broadcasts an advertising signal into the network in which the mobile phone 200 is participating according to control by the application activated in step S509, thereby notifying the digital camera 100 of its own presence.

Upon receiving the advertising signal transmitted in step S510, the digital camera 100 displays a screen 312 illustrated in FIG. 3A. The screen 312 is a screen on which connectable apparatuses participating in the network of the digital camera 100 are displayed as a list. The example of the screen 312 indicates that My-Smartphone 1, My-Mediaplayer, and My-Smartphone 2 are participating in the network created by the digital camera 100. The digital camera 100 displays the character string such as this “My-Smartphone” by determining a device type contained in the advertising signal, and reading out an appropriate character string from the memory. In a case where the digital camera 100 receives advertisements from a plurality of devices the same in type, the digital camera 100 numbers them in the order of receiving the advertisements, like My-Smartphone 1 and My-Smartphone 2, to thereby distinguish them from one another. Another method can also be employed as the method for this display. For example, the method may be performed in such a manner that the mobile phone 200 side adds a preset character string to the advertising signal and then transmits this advertising signal, and the digital camera 100 displays this added character string. Further, for an apparatus that has once connected to the digital camera 100, the digital camera 100 acquires and holds identification information thereof, and associates an arbitrary character string input by the user with this identification information. Then, the digital camera 100 may display the associated character string in the display of the list of devices in the network, when this apparatus connects to the digital camera 100 again.

By selecting an apparatus to which the user wants to connect from this screen 312, the user can instruct the digital camera 100 to establish the connection between the apparatuses via the wireless LAN.

In step S511, the digital camera 100 receives a selection of any of the apparatuses displayed on the screen 312 illustrated in FIG. 3A from the user.

Upon the selection of the apparatus, in step S512, the digital camera 100 starts the connection processing for connecting to the mobile phone 200 selected in step S511. Along therewith, the digital camera 100 displays a screen 313 illustrated in FIG. 3A, which is a screen indicating that the connection processing is in progress, thereby making the user aware of the connection processing in progress.

In step S513, the mobile phone 200 notifies the digital camera 100 whether the connection is permitted or rejected. If the digital camera 100 is notified that the connection is permitted at this time, then in step S514, the connection between the digital camera 100 and the mobile phone 200 is completed.

Upon the completion of the connection between the digital camera 100 and the mobile phone 200, the digital camera 100 displays a screen 314 illustrated in FIG. 3A. On the other hand, the mobile phone 200 displays a screen 411 illustrated in FIG. 4.

In step S515, the user of the digital camera 100 selects an image that the user wants to transmit. At this time, on the screen 314 illustrated in FIG. 3A, the user can cause the digital camera 100 to display an image next or previous to the currently displayed image to select the image that the user wants to transmit by operating the direction key or the dial included in the operation unit 105. The user can input an instruction to transmit the currently displayed image by selecting a “TRANSMIT THIS IMAGE” icon while the image that the user wants to transmit is displayed. If the user wants to cancel the image transmission, the user can return to the screen 310 by pressing a “MENU” button included in the operation unit 105. The digital camera 100 makes the user aware of that by a display of an upper right icon on the screen 314. Further, an “M2” icon displayed above the “TRANSMIT THIS IMAGE” icon indicates a size after the image is resized, in a case where the image is resized and transmitted at the time of the transmission of the currently displayed image. The user can switch the size to another size each time the user selects this icon.

If the instruction to transmit the image is input, the digital camera 100 starts transmitting the instructed image, and also shifts to a screen 315 to notify the user that the image transmission is in progress.

On the other hand, in step S517, the mobile phone 200, which receives the image, notifies the digital camera 100 of completion of the reception of the image as soon as the mobile phone 200 completes receiving the image.

Upon reception of this notification, the screen of the digital camera 100 returns to the screen 314 illustrated in FIG. 3A, and the digital camera 100 is set into a state for transmitting an image again. In other words, if there is another image that the user wants to transmit, the user becomes able to immediately select the image and issue the instruction to transmit the image.

In some cases, at the time of the image transmission, the user may want to transmit a plurality of images collectively by issuing a single instruction, instead of issuing the instruction each time a single image is transmitted. In such a case, the user selects a “SELECT AND TRANSMIT” icon displayed on the screen 314 illustrated in FIG. 3A, by which the digital camera 100 shifts to a screen 316 for selecting a plurality of images to be transmitted. On the screen 316, the user can select an image as a transmission target by pressing a “SET” key included in the operation unit 105 with this image in a selected state (in the present exemplary embodiment, the selected state refers to a state of an image with its frame highlighted as a thick frame, like an upper left image). A check mark is displayed on the image selected as the transmission target in a superimposed manner, to indicate that this image is the transmission target. In the present exemplary embodiment, an example will be described assuming that the transmitted content is an image (a still image) for simplifying the description, but the transmitted content may be, for example, a moving image, and may be audio data. Further, the user only has to press a “MENU” button displayed on the screen 316 to cause the digital camera 100 to return from the screen 316 to the screen 314. In this case, the digital camera 100 returns to the screen 314, instead of returning to the top screen, unlike the function of the “MENU” button displayed on the screen 314 (this button causes the digital camera 100 to return to the top screen of a communication menu).

When the transmission instruction is input with the plurality of images selected from the screen 316 illustrated in FIG. 3A, the digital camera 100 displays a transmission confirmation screen such as a screen 317 illustrated in FIG. 3A, and starts transmitting the images after receiving an instruction to start the transmission processing from the user, before shifting to the screen 315 illustrated in FIG. 3A. When the transmission is started from the screen 317 illustrated in FIG. 3A, the digital camera 100 also displays the screen 315 illustrated in FIG. 3A while the image transmission is in progress.

The mobile phone 200 notifies the user that the image reception is in progress by displaying a screen 412 illustrated in FIG. 4 while the image reception is in progress.

This is all the description about the procedure for establishing the wireless LAN connection by operating the digital camera 100 and the mobile phone 200 individually, and transmitting the image(s).

<Image Transmission Procedure Using Handover at the Time of Single-Reproduction>

A subsequent description is about a procedure for transmitting an image by subjecting the digital camera 100 to the NFC touch with the mobile phone 200 while the digital camera 100 is displaying a single-reproduction screen, and handing over the connection to the wireless LAN connection.

Figure 3B:
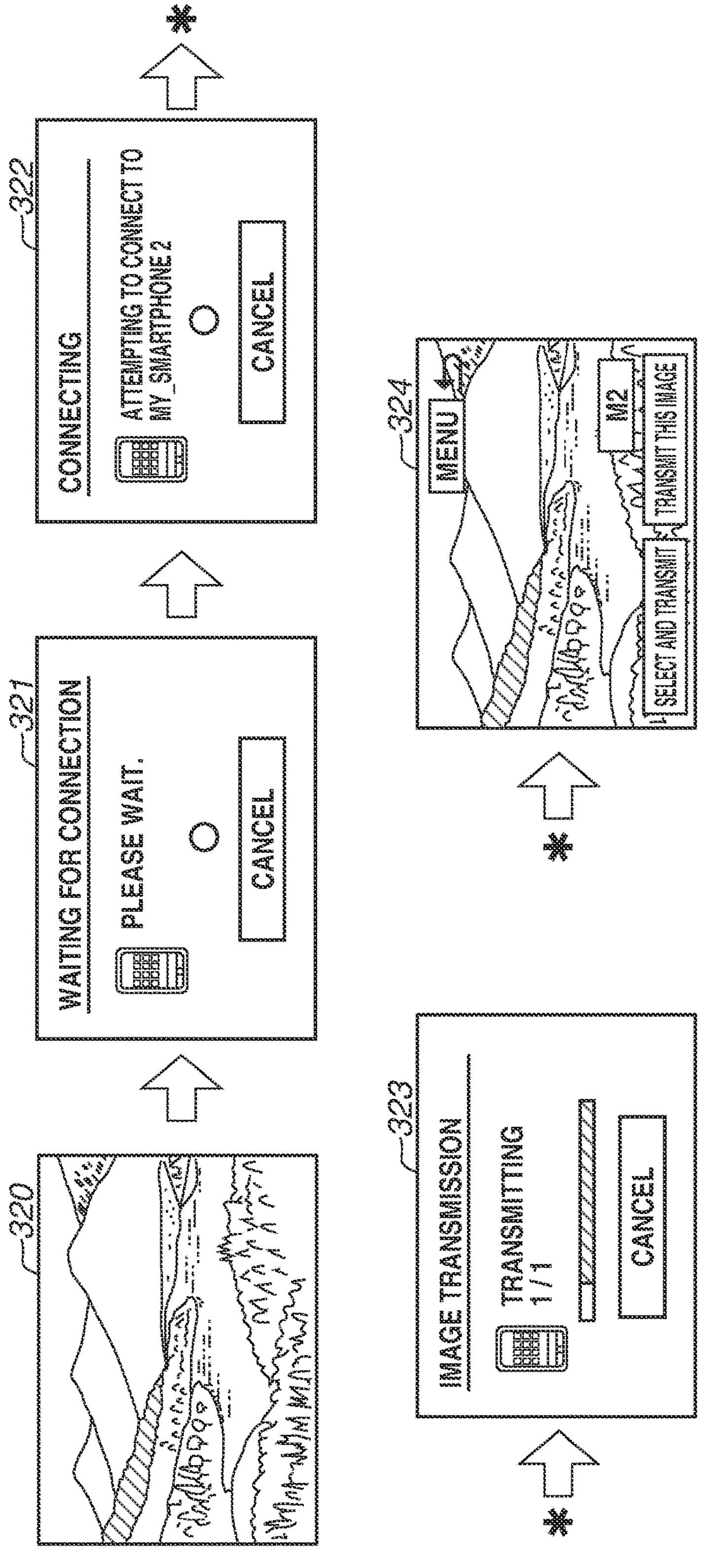
FIG. 3B illustrates a screen transition during a transfer started from a touch at the time of single-reproduction of the digital camera according to the first exemplary embodiment.

FIG. 3B illustrates one example of screens displayed on the display unit 106 of the digital camera 100. The user can input an instruction for causing the digital camera 100 to shift to the reproduction mode by, for example, pressing the reproduction button included in the operation unit 105 of the digital camera 100.

Figure 6:
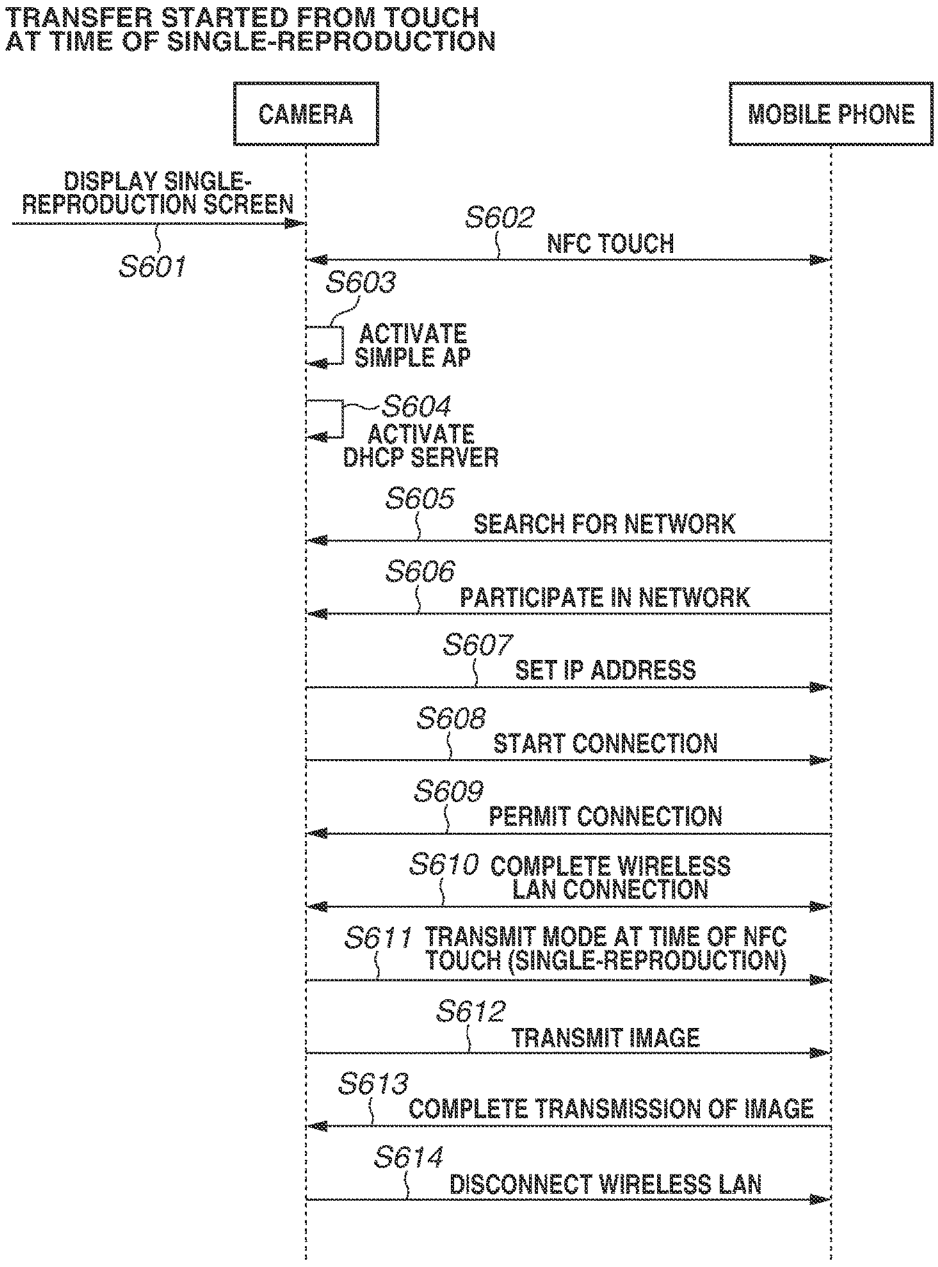
FIG. 6 is a sequence diagram illustrating the transfer started from the touch at the time of the single-reproduction between the digital camera and the mobile phone according to the first exemplary embodiment.

FIG. 6 is a sequence diagram performed in a case where the digital camera 100 connects to the mobile phone 200 via the wireless LAN from the NFC touch during the single-reproduction.

In step S601, the digital camera 100 displays a screen 320 illustrated in FIG. 3B, if receiving the instruction to shift to the reproduction mode by pressing the reproduction button.

Subsequently, in step S602, the digital camera 100 and the mobile phone 200 are placed in close proximity to each other while the digital camera 100 is displaying the screen 320 illustrated in FIG. 3B, and the NFC communication is performed between the close proximity wireless communication unit 112 and the close proximity wireless communication unit 212. In this communication, the digital camera 100 and the mobile phone 200 share a communication parameter required for the wireless LAN connection after step S603 (at least the SSID and a password in the present exemplary embodiment) therebetween. Further, the digital camera 100 and the mobile phone 200 also exchange information for activating the application that allows the mobile phone 200 to connect to the digital camera 100. Information published as an application programming interface (API) of the OS can be used as this information that activates the application. The mobile phone 200 activates the application according to the API received via NFC.

On the other hand, in step S603, the digital camera 100 activates the simple AP function and starts transmitting a beacon, thereby creating a network. The beacon transmitted at this time contains the SSID exchanged in step S602. Further, along therewith, the digital camera 100 displays a screen 321 illustrated in FIG. 3B. In the case of the handover, the mobile phone 200 can recognize the communication parameter of the network created by the digital camera 100 via NFC in advance, whereby the user does not have to select the network which the mobile phone 200 participates in. Therefore, the SSID is not displayed on the screen 321, unlike the screen 311, and the mobile phone 200 proceeds with the processing in the background without requiring the user to be aware of the SSID.

After that, in step S604, the digital camera 100 activates the function of the DHCP server.

On the other hand, in step S605, the mobile phone 200 searches for the network of the digital camera 100 based on the information acquired in step S602 (the SSID in the present exemplary embodiment). More specifically, the mobile phone 200 receives a beacon around the mobile phone 200, and compares an SSID contained in the received beacon and the SSID received via NFC to determine whether they match each other.

In step S606, the mobile phone 200 participates in the network discovered in the network search in step S605. This results in participation in the network of the digital camera 100, since the SSID transmitted via NFC is contained in the beacon started being transmitted by the digital camera 100 in step S603. When participating in the network, the mobile phone 200 passes authentication with use of the password received via NFC.

In step S607, the digital camera 100 sets an IP address to the mobile phone 200 with use of the function of the DHCP server.

In step S608, the digital camera 100 displays a screen 322 illustrated in FIG. 3B to notify the user that the digital camera 100 is connecting to the mobile phone 200, and starts the processing for connecting to the mobile phone 200 subjected to the NFC touch in step S602.

In step S609, the mobile phone 200 notifies the digital camera 100 whether the connection is permitted or rejected. If the digital camera 100 is notified that the connection is permitted at this time, then in step S610, the connection between the digital camera 100 and the mobile phone 200 is completed.

Upon the completion of the processing for connecting the digital camera 100 and the mobile phone 200 to each other via the wireless LAN, then in step S611, the digital camera 100 notifies the mobile phone 200 of the sub mode in the reproduction mode of the digital camera 100 at the time of the NFC touch via the wireless LAN. As described above, there is the single-reproduction and the multi-reproduction as the method for reproducing an image in the reproduction mode. In the notification at this time, the digital camera 100 transmits information indicating which mode the sub mode is, the single-reproduction or the multi-reproduction in the reproduction mode. In the example illustrated in FIG. 6, the reproduction mode of the digital camera 100 is in a state of the single-reproduction at the time of the NFC touch, whereby the digital camera 100 notifies the mobile phone 200 that the sub mode is the single-reproduction. Different processing is performed on the digital camera 100 side depending on whether the sub mode is the single-reproduction or the multi-reproduction, as will be described below. The mobile phone 200 cannot communicate with the digital camera 100 correctly unless the mobile phone 200 side also deals with this difference in the processing. In other words, the digital camera 100 issues the notification of the sub mode in the reproduction mode in this step to cause the mobile phone 200 to deal with the difference in the processing on the digital camera 100 side.

The digital camera 100 can also notify the mobile phone 200 of the sub mode in the reproduction mode of the digital camera 100 via NFC. However, in a case where the NFC module mounted on the digital camera 100 is embodied by a tag, the following point should be kept in mind. The NFC tag does not transmit information to a partner apparatus actively, but transmits the information to the partner apparatus by causing the partner apparatus to read out the information recorded in the tag (a memory thereof). Therefore, the digital camera 100 should record the sub mode into the NFC tag in advance to notify the partner apparatus of the sub mode. For example, if the sub mode is switched back and forth between the single-reproduction and the multi-reproduction while the digital camera 100 is in operation in the reproduction mode, the digital camera 100 should rewrite the content of the tag each time the sub mode is switched. Generally, access to the tag is prohibited while the content is being rewritten, and this means that the handover is impossible during this time period even when the digital camera 100 is subjected to the NFC touch. Further, it cannot be said to be desirable that the tag is rewritten highly frequently also in terms of a processing load imposed on the control unit 101 and consumption of the number of rewritable times of the tag. For these reasons, in the present exemplary embodiment, the digital camera 100 stores the state when the digital camera 100 has been subjected to the NFC touch, and notifies the partner apparatus of the sub mode via the wireless LAN, instead of rewriting the content of the tag each time the sub mode is switched back and forth between the single-reproduction and the multi-reproduction.

In step S612, the digital camera 100 transmits an image displayed when the digital camera 100 has been subjected to the NFC touch with the mobile phone 200, to the mobile phone 200. This transmission of the image does not require the user to perform any operation since the digital camera 100 is subjected to the NFC touch until the digital camera 100 transmits the image. This is because it is assumed that the user has such an intention that the user wants to transmit the currently reproduced image easily or immediately when the digital camera 100 is subjected to the NFC touch at the time of the single-reproduction.

Further, the digital camera 100 displays a transmission in progress screen such as a screen 323 illustrated in FIG. 3B while the image transmission is in progress. Further, a screen 412 illustrated in FIG. 4 is displayed on the mobile phone 200 that is receiving the image.

In step S613, the digital camera 100 completes transmitting the image to the mobile phone 200. Then, in step S614, the digital camera 100 disconnects the wireless LAN connection. After the digital camera 100 disconnects the wireless LAN connection, the screen of the digital camera 100 returns to the single-reproduction screen as the screen 320 illustrated in FIG. 3B.

This is all the description about the procedure for transmitting the image by subjecting the digital camera 100 to the NFC touch with the mobile phone 200 while the digital camera 100 is displaying the single-reproduction screen, and handing over the connection to the wireless LAN connection therefrom.

<Image Transmission Procedure Using Handover at the Time of Multi-Reproduction>

A subsequent description is about a procedure for transmitting an image or images by subjecting the digital camera 100 to the NFC touch with the mobile phone 200 while the digital camera 100 is displaying a multi-reproduction screen, and handing over the connection to the wireless LAN connection.

Figure 3C:
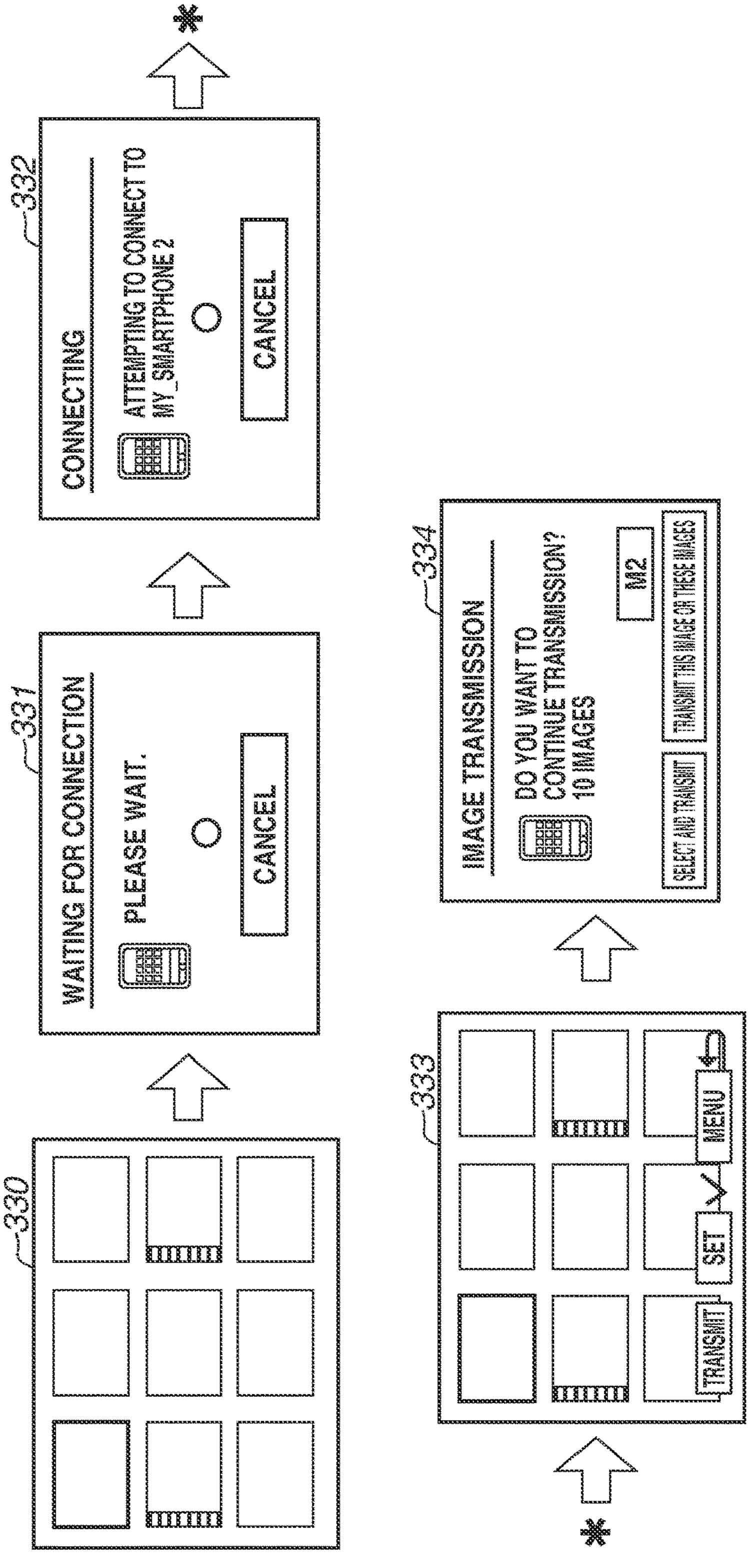
FIG. 3C illustrates a screen transition during a transfer started from the touch at the time of multi-reproduction of the digital camera according to the first exemplary embodiment.

FIG. 3C illustrates one example of screens displayed on the display unit 106 of the digital camera 100. The user can input the instruction for causing the digital camera 100 to shift to the reproduction by, for example, pressing the reproduction button included in the operation unit 105 of the digital camera 100. When shifting to this reproduction mode, first, the digital camera 100 starts the reproduction mode in the single-reproduction mode. Then, the user can cause the digital camera 100 to shift to the multi-reproduction mode by, for example, operating the zoom lever of the operation unit 105 as described above.

Figure 7:
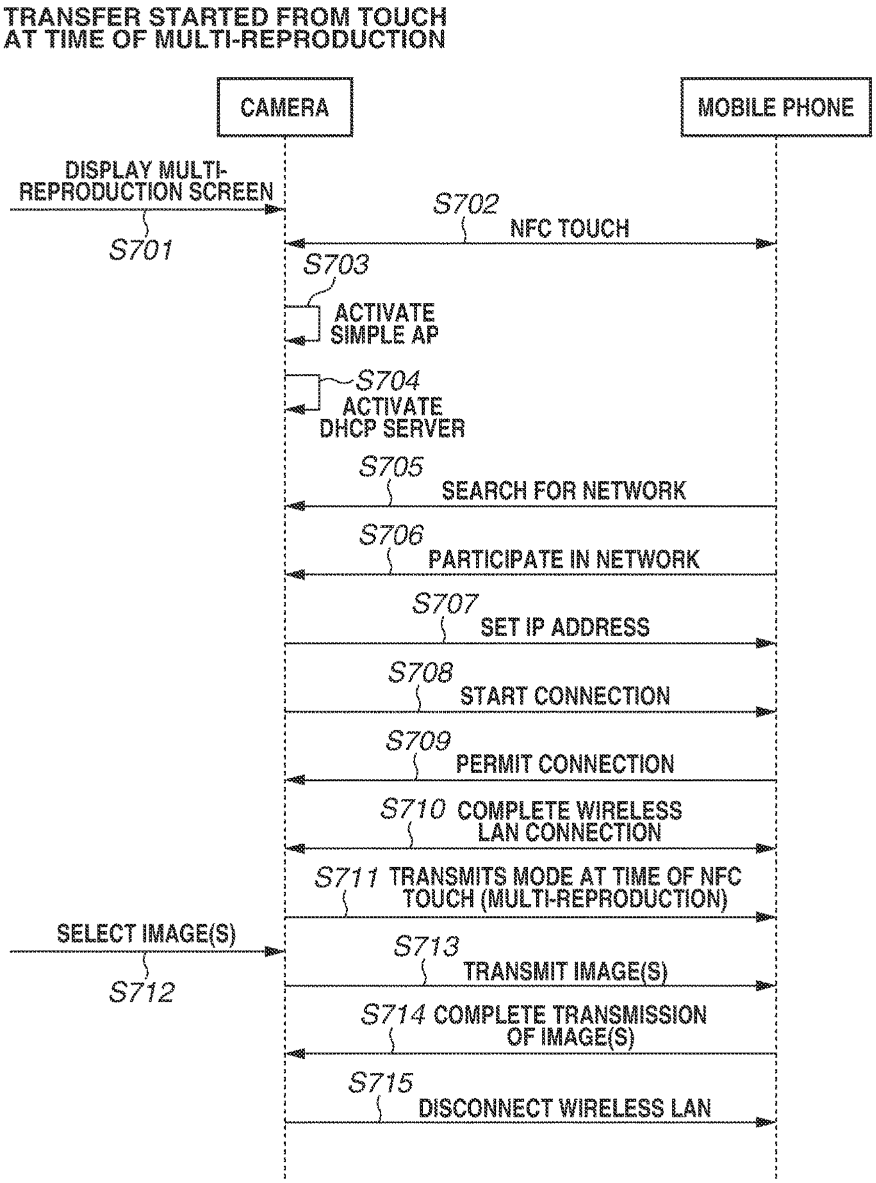
FIG. 7 is a sequence diagram illustrating the transfer started from the touch at the time of the multi-reproduction between the digital camera and the mobile phone according to the first exemplary embodiment.

FIG. 7 is a sequence diagram performed in a case where the digital camera 100 connects to the mobile phone 200 via the wireless LAN from the NFC touch during the multi-reproduction.

In step S701, the digital camera 100 displays a screen 330 illustrated in FIG. 3C, if receiving an instruction to shift to the multi-reproduction mode by, for example, the operation performed on the zoom lever.

In steps S702 to S710, processing similar to those performed in steps S602 to S610 illustrated in FIG. 6 is performed.

Upon the completion of the processing for connecting the digital camera 100 and the mobile phone 200 to each other via the wireless LAN, in step S711, the digital camera 100 notifies the mobile phone 200 of the sub mode in the reproduction mode of the digital camera 100 at the time of the NFC touch. In the example illustrated in FIG. 7, in this notification, the digital camera 100 transmits information indicating the multi-reproduction since the reproduction mode of the digital camera 100 is in a state of the multi-reproduction at the time of the NFC touch.

Further, along therewith, the screen of the digital camera 100 shifts to a screen 333 illustrated in FIG. 3C. In other words, the digital camera 100 shifts to a screen for selecting an image or images to be transmitted, unlike the screen displayed when the connection is handed over to the wireless LAN connection from the NFC touch at the time of the single-reproduction. This is because it is supposed that the user has such an intention that the user wants to select and transmit a plurality of images when the digital camera 100 is subjected to the NFC touch at the time of the multi-reproduction. Images displayed when the digital camera 100 has been subjected to the NFC touch in step S702 (in other words, images displayed on the screen 330) are displayed as images displayed on this screen to which the digital camera 100 shifts.

In step S712, the digital camera 100 receives a selection of the image(s) that the user wants to transmit from the screen 333 illustrated in FIG. 3C. As one possibility, in some cases, the user may want to transmit an image other than the images displayed when the digital camera 100 has been subjected to the NFC touch in step S702. Therefore, the user can change the images displayed on the screen by operating the direction key, the dial, or the like on the screen 333. For example, if receiving a change instruction while displaying a part of images recorded in the recording medium 110, the digital camera 100 displays another part of the images.

On the other hand, at this time, the mobile phone 200 displays a screen 413 illustrated in FIG. 4, and the user cannot input any operation from the mobile phone 200.

Upon completion of the image selection and an input of a transmission instruction, the digital camera 100 displays a transmission confirmation screen 334 illustrated in FIG. 3C. Then, upon receiving a transmission instruction, in step S713, the digital camera 100 transmits the image(s) to the mobile phone 200.

In step S714, the digital camera 100 completes transmitting the image(s) to the mobile phone 200. Then, in step S715, the digital camera 100 disconnects the wireless LAN connection. After disconnecting the wireless LAN connection, the digital camera 100 displays the single-reproduction screen such as the screen 320 illustrated in FIG. 3B. Instead thereof, at this time, the digital camera 100 may return to the multi-reproduction screen, which is the originally displayed screen.

This is all the description about the procedure for transmitting the image(s) by subjecting the digital camera 100 to the NFC touch with the mobile phone 200 while the digital camera 100 is displaying the multi-reproduction screen, and handing over the connection to the wireless LAN connection.

<Flowchart illustrating Operation of Digital Camera 100>

Next, an operation of the digital camera 100 according to the present exemplary embodiment for realizing the above-described operations will be described.

Figure 8:
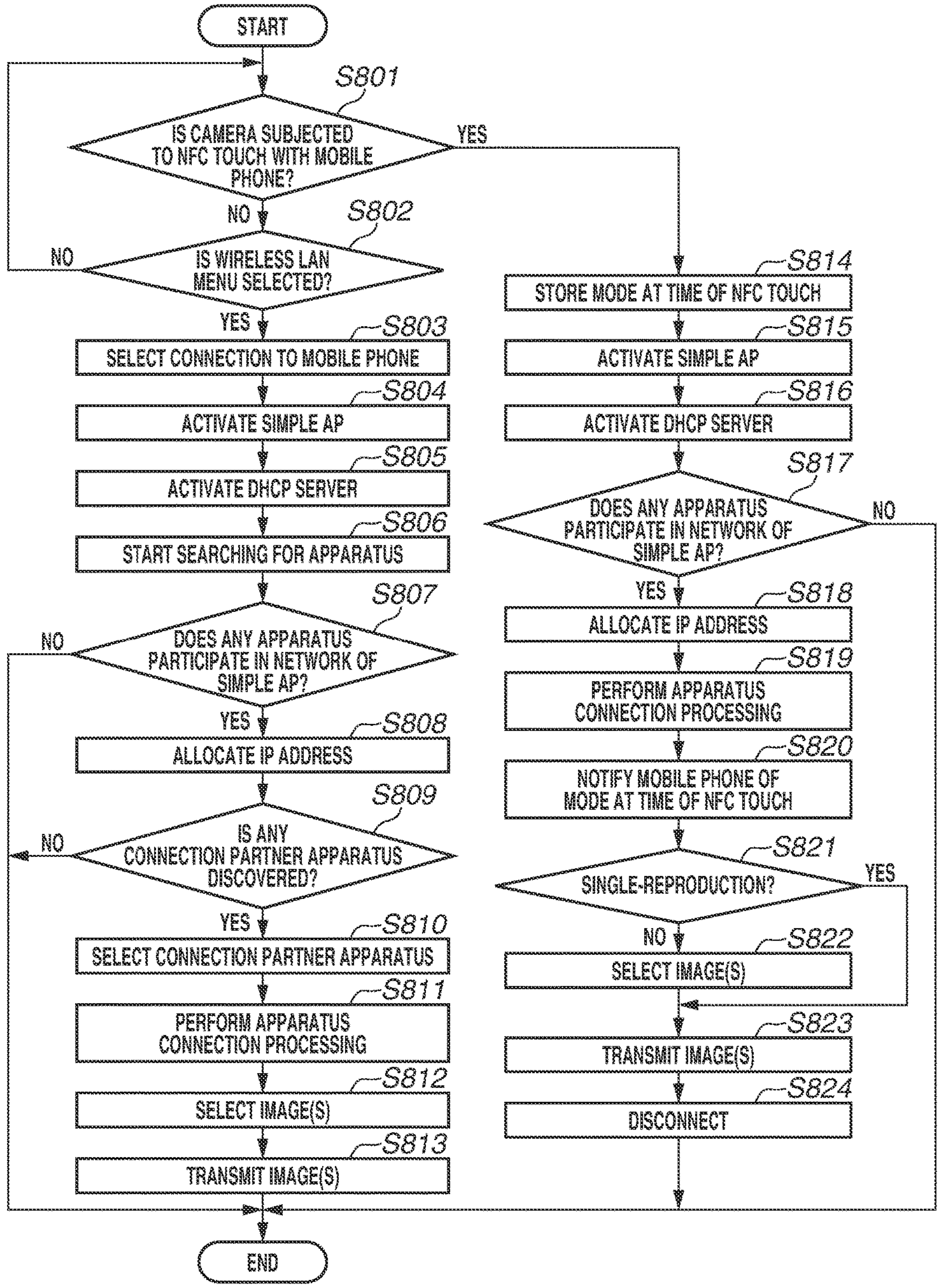
FIG. 8 is a flowchart of the digital camera according to the first exemplary embodiment.

FIG. 8 is a flowchart illustrating a flow of connection processing performed by the digital camera 100 according to the first exemplary embodiment. The control unit 101 loads the program stored in the nonvolatile memory 103 into the work memory 104 and executes the loaded program, by which each process illustrated in this flowchart is realized. Further, powering on the digital camera 100 triggers a start of the flowchart illustrated in FIG. 8.

First, in step S801, the control unit 101 detects close proximity of the mobile phone 200 via the close proximity wireless communication unit 112, and determines whether the close proximity wireless communication has been performed. If the control unit 101 determines that the close proximity wireless communication has been performed in step S801 (YES in step S801), the processing proceeds to step S814. If the control unit 101 determines that the close proximity wireless communication has not been performed in step S801 (NO in step S801), the processing proceeds to step S802. Step 801 corresponds to step S602 illustrated in FIG. 6 or step S702 illustrated in FIG. 7.

In step S802, the control unit 101 determines whether the wireless LAN menu is selected by the user with use of the operation unit 105. If the control unit 101 determines that the wireless LAN menu is not selected in step S802 (NO in step S802), the processing returns to step S801, from which the processes of steps S801 and S802 are repeated until the close proximity wireless communication is performed (YES in step S801) or the selection of the wireless LAN menu is received (YES in step S802). On the other hand, if the control unit 101 determines that the wireless LAN menu is selected in step S802 (YES in step S802), the processing proceeds to step S803.

The case will be described in which the processing exits the loop of steps S801 and S802 as the control unit 101 determines that the wireless LAN menu is selected in step S802 (YES in step S802). In this case (YES in step S802), the processing proceeds to step S803 as described above.

In step S803, the control unit 101 displays the wireless LAN menu list of the screen 310 illustrated in FIG. 3A on the display unit 106, and receives the selection of the apparatus to be set as the connection destination. In the present example, the processing will be further described assuming that the mobile phone is selected at this time. Step S803 corresponds to step S501 illustrated in FIG. 5.

In step S803, the user selects the mobile phone as the connection destination with use of the operation unit 105. Then, in step S804, the control unit 101 activates the simple AP function and starts transmitting the beacon with use of the connection unit 111, thereby creating the network. Step S804 corresponds to step S502 illustrated in FIG. 5. Further, along therewith, the control unit 101 displays the screen 311 illustrated in FIG. 3A on the display unit 106 to notify the user of the SSID of the network created by the digital camera 100.

In step S805, the control unit 101 activates the DHCP server function. The DHCP server function has a function of allocating the IP address to the apparatus participating in the activated simple AP. Step S805 corresponds to step S503 illustrated in FIG. 5.

In step S806, the control unit 101 starts apparatus search processing with use of the connection unit 111. The apparatus search processing is realized with use of a protocol such as Universal Plug and Play (UPnP) and multicast Domain Name System (mDNS). Step S806 corresponds to step S504 illustrated in FIG. 5.

Next, in step S807, the control unit 101 determines whether any apparatus participates in the network created in step S804. More specifically, the control unit 101 determines whether the request to participate in the network is received from the mobile phone 200. If the control unit 101 determines that some apparatus participates in the network in step S807 (YES in step S807), the processing proceeds to step S808. If the control unit 101 determines that no apparatus participates in the network even after a predetermined time period has elapsed in step S807 (NO in step S807), the processing is ended. Step S807 corresponds to step S507 illustrated in FIG. 5.

In step S808, the control unit 101 allocates the IP address to the apparatus participating in the network of the digital camera 100 with use of the DHCP server function. Step S808 corresponds to step S508 illustrated in FIG. 5.

Next, in step S809, the control unit 101 determines whether any partner apparatus is discovered with use of the connection unit 111. If the control unit 101 determines that some partner apparatus is discovered in step S809 (YES in step S809), the processing proceeds to step S810. If the control unit 101 determines that no partner apparatus is discovered in step S809 (NO in step S809), the connection processing is ended. The control unit 101 makes the determination in step S809 based on the advertisement transmitted in step S510 illustrated in FIG. 5. Further, if the control unit 101 determines that some partner apparatus is discovered (YES in step S809), the control unit 101 displays the list of the discovered apparatuses, like the screen 312 illustrated in FIG. 3, on the display unit 106.

In step S810, the control unit 101 receives the operation of selecting a desired connection partner apparatus from the list of the discovered partner apparatuses with use of the operation unit 105. Step S810 corresponds to step S511 illustrated in FIG. 5. The processing after that will be described below assuming that the mobile phone 200 is selected at this time.

In step S811, the control unit 101 performs the apparatus connection processing for connecting to the connection partner apparatus selected in step S810 (i.e., the mobile phone 200). The apparatus connection processing here refers to processing for starting the communication with the apparatus with use of a protocol for, for example, transmitting and receiving an image (processing for connecting to the apparatus on a so-called application level). In this connection, a different protocol can be used for each service. For example, Hypertext Transfer Protocol (HTTP) or Picture Transfer Protocol (PTP) is used for transmission and reception of an image. For example, a unique protocol is used for remote imaging. With this processing, the connection to the connection partner apparatus (the mobile phone 200) is completed. Step S811 corresponds to steps S512 to S514 illustrated in FIG. 5. Further, the control unit 101 displays the screen 313 illustrated in FIG. 3A on the display unit 106 while the apparatus connection processing is in progress. Upon completion of the apparatus connection processing, the control unit 101 displays the screen 314 illustrated in FIG. 3A on the display unit 106.

In step S812, the control unit 101 receives the selection of the image(s) that the user wants to transmit, and the transmission instruction from the user via the operation unit 105. Step S812 corresponds to step S515 illustrated in FIG. 5. The control unit 101 receives the transmission instruction by receiving the selection of the "TRANSMIT THIS IMAGE" icon on the screen 314 illustrated in FIG. 3A as described above. Further, when collectively transmitting the plurality of images, after shifting to the screen 316 illustrated in FIG. 3A, the control unit 101 receives the selection of the "TRANSMIT" icon after the images that the user wants to transmit are selected thereon, and further receives the selection of the "TRANSMIT THIS IMAGE OR THESE IMAGES" icon on the image transmission confirmation screen 317. If the control unit 101 receives the transmission instruction, the processing proceeds to step S813.

In step S813, the control unit 101 transmits the image(s) for which the control unit 101 has received the selection in step S812, to the connection partner apparatus (the mobile phone 200). Step S813 corresponds to steps S516 and S517 illustrated in FIG. 5. Further, the control unit 101 displays the screen 315 illustrated in FIG. 3A on the display unit 106 while the image transmission is in progress.

Upon completion of the transmission, the processing illustrated in the present flowchart is ended. In the case where the image transmission is carried out through the processes of steps S802 to step S813, the wireless LAN connection is maintained even after the completion of the image transmission. Then, for example, the control unit 101 returns the screen displayed on the display unit 106 to the screen 314 illustrated in FIG. 3A, and waits for an instruction for next image transmission. In other words, the processes of steps S812 and S813 are repeated until the control unit 101 receives an explicit instruction for the disconnection, or an explicit instruction to power off the digital camera 100 from the user.

This is all the description about the steps which the processing proceeds to if the control unit 101 determines that the close proximity wireless communication is not performed in step S801 (NO in step S801).

Next, the processing will be described, performed if the control unit 101 determines that the close proximity wireless communication is performed in step S801 (YES in step S801).

In step S814, the control unit 101 stores the operation mode of the digital camera 100 when the close proximity wireless communication is performed with the mobile phone 200 in step S801, into the work memory 104. Step S814 corresponds to step S602 illustrated in FIG. 6 or step S702 illustrated in FIG. 7.

In step S815, the control unit 101 activates the simple AP function and starts transmitting the beacon with use of the connection unit 111, thereby creating the network. In the present case, the control unit 101 creates the network with use of the communication parameter transmitted to the mobile phone 200 via the close proximity wireless communication performed in step S801. Step S815 corresponds to step S603 illustrated in FIG. 6 or step S703 illustrated in FIG. 7. Further, the control unit 101 displays the screen 321 illustrated in FIG. 3B or the screen 331 illustrated in FIG. 3C on the display unit 106 to notify the user that the digital camera 100 is waiting for the connection.

In step S816, the control unit 101 activates the DHCP server function. Step S816 corresponds to step S604 illustrated in FIG. 6 or step S704 illustrated in FIG. 7.

In step S817, the control unit 101 determines whether any apparatus participates in the network created with use of the simple AP function activated in step S815. If the control unit 101 determines that some apparatus participates in the network in step S817 (YES in step S817), the processing proceeds to step S818. If the control unit 101 determines that no apparatus participates in the network in step S817 (NO in step S817), the connection processing is ended. The control unit 101 makes the determination in step S817 based on whether the request to participate in the network that the mobile phone 200 has transmitted in step S606 illustrated in FIG. 6 or step S706 illustrated in FIG. 7 is received.

In step S818, the control unit 101 allocates the IP address to the apparatus participating in the network of the digital camera 100 with use of the DHCP server function. Step S818 corresponds to step S607 illustrated in FIG. 6 or step S707 illustrated in FIG. 7.

In step S819, the control unit 101 performs the apparatus connection processing for connecting to the connection partner apparatus with use of the information about the connection partner acquired via the close proximity wireless communication in step S801. Then, the processing proceeds to step S820. With this processing, the connection to the connection partner apparatus is completed. Step S819 corresponds to steps S608 to S610 illustrated in FIG. 6 or steps S708 to S710 illustrated in FIG. 7. Further, the control unit 101 displays the screen indicating the partner apparatus as the connection destination, which is exemplified by the screen 322 illustrated in FIG. 3B or the screen 332 illustrated in FIG. 3C, on the display unit 106, while the apparatus connection processing is in progress.

In step S820, the control unit 101 notifies the mobile phone 200 of the operation mode of the digital camera 100 when the close proximity wireless communication has been performed, which has been stored into the work memory 104 in step S814, with use of the connection unit 111. Step S820 corresponds to step S611 illustrated in FIG. 6 or step S711 illustrated in FIG. 7.

Further, in step S821, the control unit 101 determines whether the sub mode in the reproduction mode of the digital camera 100 has been the single-reproduction when the close proximity wireless communication has been performed with the mobile phone 200 in step S801. The control unit 101 makes the determination in step S821 based on the mode stored in step S814. If the control unit 101 determines in step S821 that the sub mode has not been the single-reproduction (NO in step S821), i.e., determines that the sub mode has been the multi-reproduction, the processing proceeds to step S822, in which the control unit 101 receives the selection of the image(s) to be transmitted. On the other hand, if the control unit 101 determines in step S821 that the sub mode has been the single-reproduction (YES in step S821), the processing proceeds to step S823 without passing through step S822.

In step S822, the control unit 101 receives the selection of the image(s) to be transmitted and the transmission instruction from the user with use of the operation unit 105. Step S822 corresponds to step S712 illustrated in FIG. 7. Further, the control unit 101 receives the selection of the image(s) to be transmitted by displaying the image selection screen exemplified by the screen 333 illustrated in FIG. 3C on the display unit 106. Further, if receiving the transmission instruction, the control unit 101 displays the selected image confirmation screen exemplified by the screen 334 illustrated in FIG. 3C. If the control unit 101 receives the transmission instruction on the screen 334, the processing proceeds to step S823.

In step S823, the control unit 101 transmits the image(s) to the mobile phone 200 with use of the connection unit 111. At this time, the control unit 101 transmits the image(s) selected in step S822, in the case where the image transmission is carried out through step S822. On the other hand, the control unit 101 transmits the image reproduced in the single-reproduction, in the case where the image transmission is carried out without passing through step S822. Step S823 corresponds to step S612 illustrated in FIG. 6 or step S713 illustrated in FIG. 7. Further, the control unit 101 displays the image transmission in progress screen such as the screen 323 illustrated in FIG. 3B on the display unit 106 while the image transmission is in progress.

Upon completion of the image transmission, in step S824, the control unit 101 disconnects the wireless LAN connection with use of the control unit 101, and the processing is ended. Step S824 corresponds to step S614 illustrated in FIG. 6 or step S715 illustrated in FIG. 7.

This is all the description about the flowchart illustrating the operation of the digital camera 100 according to the present exemplary embodiment.

<Flowchart Illustrating Operation of Mobile Phone 200>

Next, an operation of the mobile phone 200 according to the present exemplary embodiment for realizing the above-described operations will be described.

Figure 9:
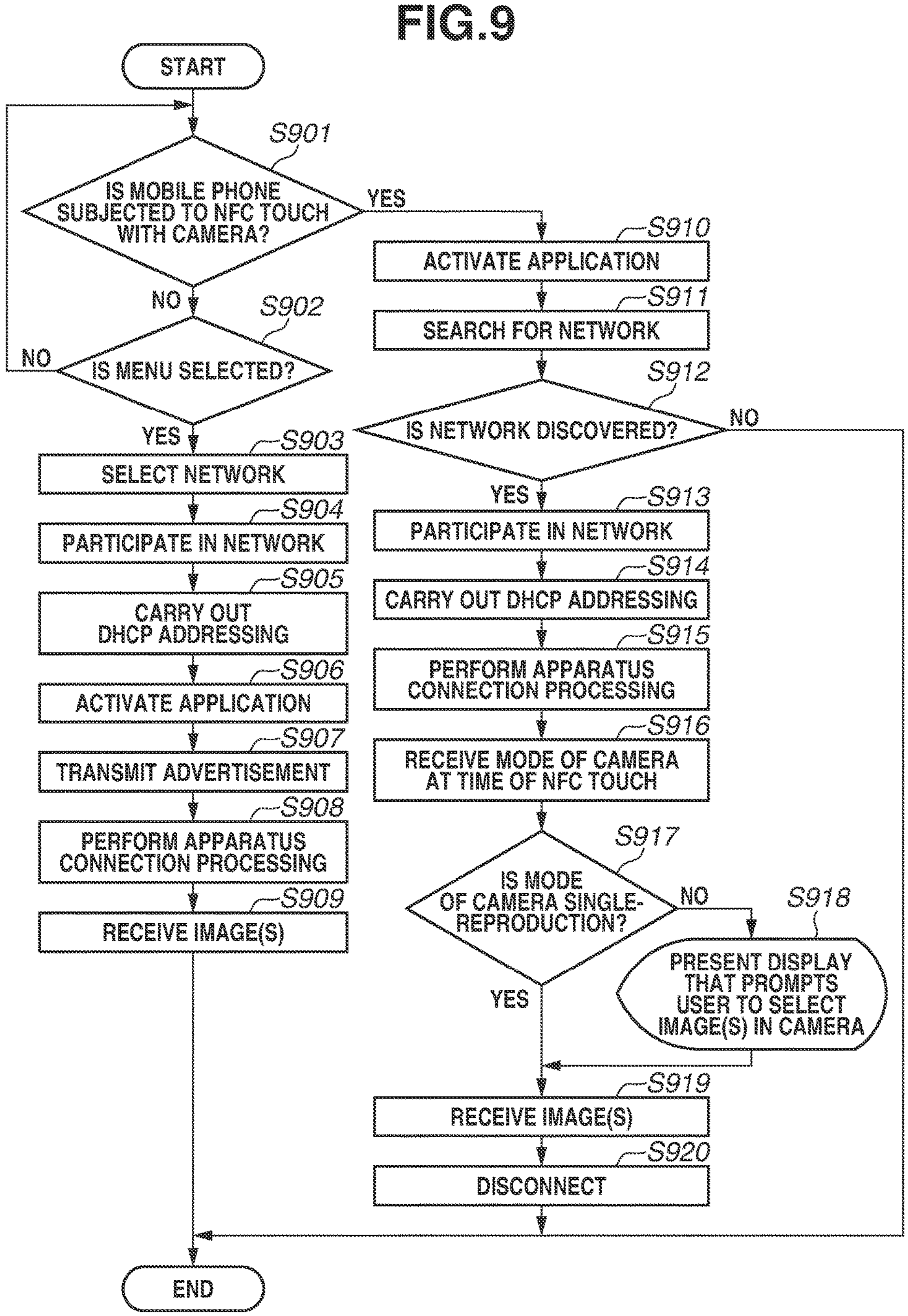
FIG. 9 is a flowchart of the mobile phone according to the first exemplary embodiment.

FIG. 9 is a flowchart illustrating a flow of connection processing performed by the mobile phone 200 according to the first exemplary embodiment. The control unit 201 loads the program stored in the nonvolatile memory 203 into the work memory 204 and executes the loaded program, by which each process illustrated in this flowchart is realized.

First, in step S901, the control unit 201 detects close proximity of the digital camera 100 via the close proximity wireless communication unit 212, and determines whether the close proximity wireless communication is performed. If the control unit 201 determines that the close proximity wireless communication is performed in step S901 (YES in step S901), the processing proceeds to step S910. If the control unit 201 determines that the close proximity wireless communication is not performed in step S901 (NO in step S901), the processing proceeds to step S902. Step S901 corresponds to step S602 illustrated in FIG. 6 or step S702 illustrated in FIG. 7.

In step S902, the control unit 201 determines whether a wireless LAN setting menu is selected by the user with use of the operation unit 205. If the control unit 201 determines that the wireless LAN setting menu is not selected in step S902 (NO in step S902), the processing returns to step S901, from which the processes of steps S901 and S902 are repeated until the close proximity wireless communication is performed (YES in step S901) or the selection of the wireless LAN setting menu is received (YES in step S902). On the other hand, if the control unit 201 determines that the wireless LAN setting menu is selected in step S902 (YES in step S902), the processing proceeds to step S903.

The case will be described in which the processing exits the loop of steps S901 and S902 as the control unit 201 determines that the wireless LAN menu is selected in step S802 (YES in step S902). In this case (YES in step S902), the processing proceeds to step S903 as described above.

In step S903, the control unit 201 displays the network list, like the screen 410 illustrated in FIG. 4, on the display unit 206. This list is displayed as a result of receiving the beacons around the mobile phone 200 and listing the SSIDs contained in the received beacons. This means that, if the network of the digital camera 100 is created in step S804 illustrated in FIG. 8 before the process of this step is performed, the SSID of the network of the digital camera 100 is also displayed in this list. Further, if the network of the digital camera 100 is created after this list is displayed, the SSID is additionally displayed in the list as soon as the mobile phone 200 receives the beacon of this network and completes analyzing that.

By selecting a desired SSID from the display of the network list displayed on the display unit 206, the user can input the instruction to participate in this network. Step S903 corresponds to step S506 illustrated in FIG. 5. The processing after that will be described below assuming that the user checks the SSID displayed on the display unit 106 of the digital camera 100, and selects "Camera-123", which is the network of the digital camera 100, from the network list on the screen 410 at this time.

Upon the selection of the network, in step S904, the control unit 201 performs processing for participating in the network selected in step S903 with use of the connection unit 211. More specifically, the control unit 201 participates in the network by transmitting the request to participate in the network with use of the communication parameter of the network (the SSID in the present exemplary embodiment), and receiving the permission for the participation, which is a response to this request. Step S904 corresponds to step S507 illustrated in FIG. 5.

In step S905, the control unit 201 carries out the DHCP addressing with use of the connection unit 211. Then, the processing proceeds to step S906. The DHCP addressing is a method for acquiring the IP address by requesting the IP address to the DHCP server in the wireless network. The digital camera 100 is provided with the DHCP server function as described above, and a solution to the IP address is realized by the function of this DHCP server.

In step S906, the control unit 201 activates the application required to connect to the digital camera 100 selected by the user with use of the operation unit 205 from the nonvolatile memory 204. Then, the processing proceeds to step S907. Step S906 corresponds to step S509 illustrated in FIG. 5. The control unit 201 may activate this application before the timing of this step.

In step S907, the control unit 201 transmits the advertisement notification to the digital camera 100 with use of the connection unit 211 according to the control by the application. The transmission of the advertisement notification allows the digital camera 100 to discover the mobile phone 200. Step S907 corresponds to step S510 illustrated in FIG. 5.

In step S908, the control unit 201 performs the apparatus connection processing for connecting to the connection partner apparatus with use of the connection unit 211. Then, the processing proceeds to step S909. With this processing, the connection to the connection partner apparatus is completed. Step S908 corresponds to steps S512 to S514 illustrated in FIG. 5. Upon the completion of the connection, the control unit 201 displays the connection completion screen such as the screen 411 illustrated in FIG. 4 on the display unit 206.

In step S909, the control unit 201 receives the image(s) from the connection partner apparatus with use of the connection unit 211. Then, the processing is ended. The control unit 201 displays the image reception in progress screen such as the screen 412 illustrated in FIG. 4 on the display unit 206 while the image reception is in progress.

Next, the processing will be described, in the case where the control unit 201 determines that the close proximity wireless communication is performed in step S901 (YES in step S901). In this case (YES in step S901), the processing proceeds to step S910 as described above.

In step S910, the control unit 201 activates the application required to connect to the connection partner apparatus from the nonvolatile memory 204 based on the information received via the close proximity wireless communication.

In step S911, the control unit 201 searches for the network based on the information about the network of the connection partner apparatus that has been acquired at the time of the close proximity wireless communication in step S901, with use of the connection unit 211. Then, the processing proceeds to step S912. Step S911 corresponds to step S605 illustrated in FIG. 6 or step S705 illustrated in FIG. 7.

In step S912, the control unit 201 determines whether the network is discovered with use of the connection unit 211. If the control unit 201 determines that the network is discovered in step S912 (YES in step S912), the processing proceeds to step S913. If the control unit 201 determines that the network is not discovered even after the control unit 201 continues the search for a predetermined time period in step S912 (NO in step S912), the processing is ended.

In step S913, the control unit 201 performs the processing for participating in the network discovered in step S912 with use of the connection unit 211. Step S913 corresponds to step S606 illustrated in FIG. 6 or step S706 illustrated in FIG. 7.

In step S914, the control unit 201 carries out the DHCP addressing with use of the connection unit 211. Then, the processing proceeds to step S915.

In step S915, the control unit 201 performs the apparatus connection processing with use of the connection unit 211 based on the information acquired via the close proximity wireless communication with the digital camera 100 in step S901. With this processing, the connection to the connection partner apparatus is completed. Step S915 corresponds to steps S608 to S610 illustrated in FIG. 6 or steps S708 to S610 illustrated in FIG. 7.

In step S916, the control unit 201 receives the operation mode of the digital camera 100 at the time of the close proximity wireless communication with the digital camera 100 in step S901, from the digital camera 100 with use of the connection unit 211. Step S916 corresponds to step S611 illustrated in FIG. 6 or step S711 illustrated in FIG. 7.

In step S917, the control unit 201 determines whether the operation mode of the digital camera 100 at the time of the close proximity wireless communication that has been received in step S916 is the single-reproduction mode. If control unit 201 determines that the received operation mode of the digital camera 100 is not the single-reproduction mode in step S917 (NO in step S917), i.e., the control unit 201 determines that the received operation mode of the digital camera 100 is the multi-reproduction mode, the processing proceeds to step S918. On the other hand, if the control unit 201 determines that the received operation mode of the digital camera 100 is the single-reproduction mode in step S917 (YES in step S917), the processing proceeds to step S919 without passing through step S918.

In step S918, the control unit 201 displays the screen such as the screen 413 illustrated in FIG. 4, which prompts the user to select the image(s) that the user wants to transmit on the digital camera 100 side, with use of the display unit 206.

In step S919, the control unit 201 receives the image(s) transmitted from the digital camera 100 with use of the connection unit 211.

Step S919 corresponds to steps S612 and S613 illustrated in FIG. 6 or steps S713 and S714 illustrated in FIG. 7. The control unit 201 displays the image reception in progress screen such as the screen 412 illustrated in FIG. 4 on the display unit 206 while the image reception is in progress.

Lastly, in step S920, the control unit 201 disconnects the wireless LAN connection with the connection partner apparatus with use of the connection unit 211. Then, the processing is ended. Step S920 corresponds to step S614 illustrated in FIG. 6 or step S715 illustrated in FIG. 7.

This is all the description about the operation of the mobile phone 200 according to the present exemplary embodiment.

In the present exemplary embodiment, for the handover at the time of the single-reproduction, the digital camera 100 determines that the user places the digital camera 100 in close proximity with the intention of transmitting the currently reproduced image without newly selecting the image to be transmitted, thereby shifting to the screen for transmitting the currently reproduced image. Further, for the handover at the time of the multi-reproduction, the digital camera 100 determines that the user places the digital camera 100 in close proximity with the intention of transmitting the images after selecting the plurality of images, thereby shifting to the screen for selecting the image(s) to be transmitted. In this manner, the operation that suits the user's intension can be realized to thereby further improve usability, by changing the flow of the screen transition after the NFC touch according to the state of the reproduction mode of the digital camera 100 when the digital camera 100 is subjected to the NFC touch.

Further, in the present exemplary embodiment, after the completion of the wireless LAN connection between the digital camera 100 and the mobile phone 200, the digital camera 100 notifies the mobile phone 200 of the reproduction mode when the digital camera 100 has been subjected to the NFC touch via the wireless LAN. This method allows the digital camera 100 to notify the mobile phone 200 of the operation mode of the digital camera 100 at the time of the NFC touch without rewriting the NFC tag each time the reproduction mode is changed.

Second Exemplary Embodiment

The present exemplary embodiment will be described as processing performed in a case where the digital camera 100 fails in the image transmission when transmitting the image(s) after the digital camera 100 and the mobile phone 200 are connected to each other through the NFC touch.

Figure 10:
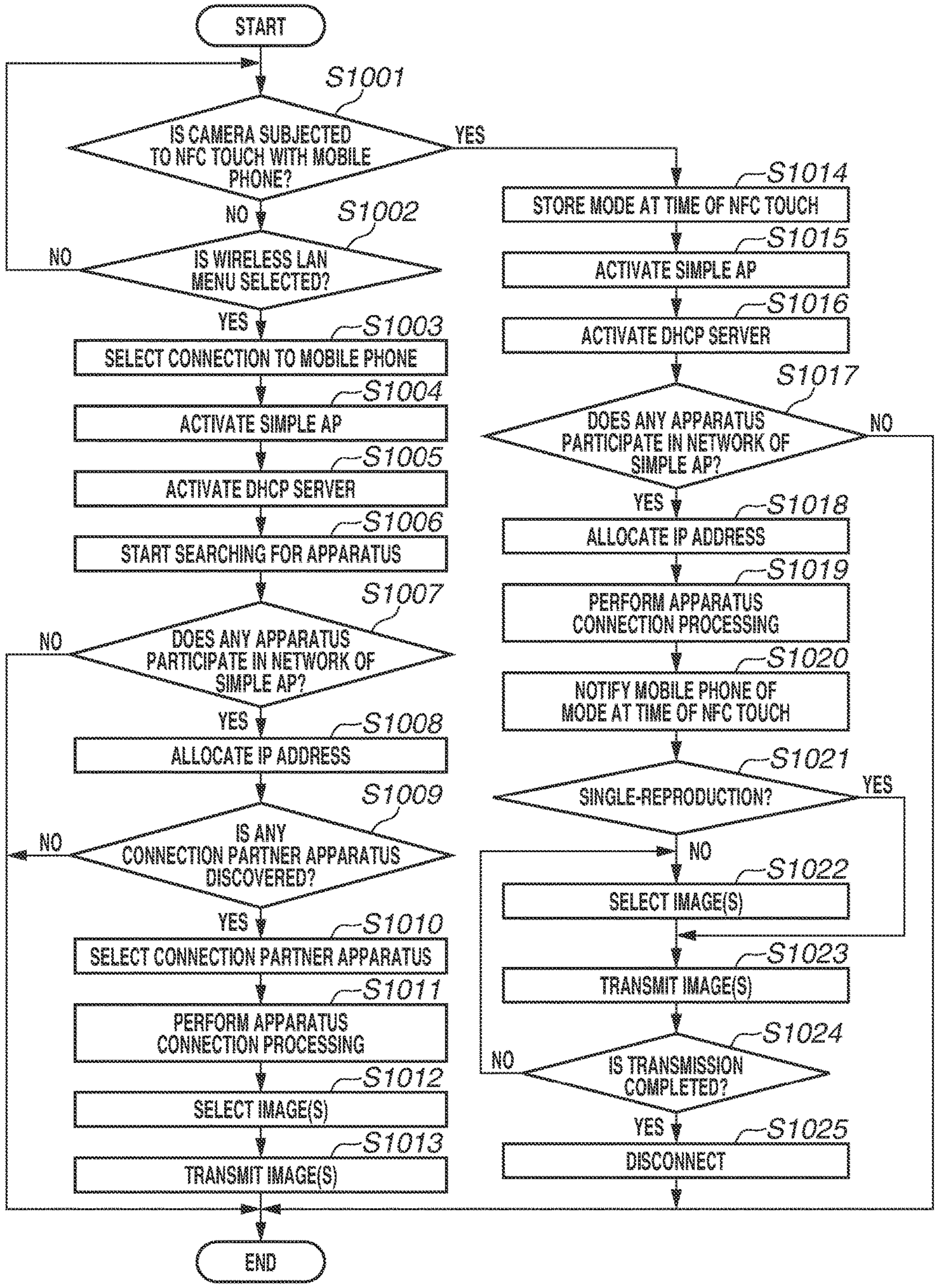
FIG. 10 is a flowchart of a digital camera according to a second exemplary embodiment.

FIG. 10 is a flowchart illustrating an operation of the digital camera 100 according to the second exemplary embodiment. The control unit 101 loads the program stored in the nonvolatile memory 103 into the work memory 104 and executes the loaded program, by which each process illustrated in this flowchart is realized. In steps S1001 to 1023, similar processes to steps S801 to S823 illustrated in FIG. 8 are performed.

In step S1024, the control unit 101 determines whether the image transmission to the mobile phone 200 in step S1023 has succeeded. If the control unit 101 determines in step S1024 that the image transmission has succeeded (YES in step S1024), the processing proceeds to step S1025. If the control unit 101 determines in step S1024 that the image transmission has failed (NO in step S1024), the processing returns to step S1022, in which the control unit 101 prompts the user to select the image(s) again. One possible case of the failure in the image transmission is that the control unit 101 determines that the digital camera 100 side has been able to transmit the image(s), but the mobile phone 200 side has been unable to receive the image(s). Examples of this case include a failure due to the transmitted image(s) having an image type unsupported by the mobile phone 200 side, and a failure due to insufficiency of a capacity of the mobile phone 200 for receiving the image(s). In this case, a signal indicating that the mobile phone 200 cannot receive the image(s) is transmitted from the mobile phone 200 to the digital camera 100, and the control unit 101 determines that the image transmission has failed by receiving this signal. Further, the failure in the image transmission also includes the image transmission canceled by the user in the middle of the image transmission.

In a case where the image transmission has failed after the digital camera 100 had been subjected to the NFC touch on the single-reproduction screen and then had connected to the mobile phone 200 via the wireless LAN, the control unit 101 displays the screen 324 illustrated in FIG. 3B on the display unit 106, so that the user can transmit the image(s) by selecting "SELECT AND TRANSMIT" or "TRANSMIT THIS IMAGE" in a similar manner to the operation when the connection is established by the manual connection.

On the other hand, in a case where the image transmission has failed after the digital camera 100 had been subjected to the NFC touch on the multi-reproduction screen and then had connected to the mobile phone 200 via the wireless LAN, the control unit 101 displays the screen 333 illustrated in FIG. 3C on the display unit 106, so that the user can select and transmit the image(s) again.

In step S1025, the control unit 101 disconnects the wireless LAN connection with the mobile phone 200 with use of the connection unit 111. Then, the processing is ended. If the image transmission has succeeded entirely, the control unit 101 disconnects the wireless LAN connection.

The digital camera 100 according to the present exemplary embodiment allows the wireless LAN connection to be maintained and thus the user to select the image(s) again, in the case of the failure in the image transmission. With this arrangement, the user can retransmit the image(s) without being bothered with additional work of reestablishing the wireless LAN connection to transmit the image(s).

OTHER EXEMPLARY EMBODIMENTS

The above-described first exemplary embodiment has been described based on the example in which the digital camera 100 transmits the image displayed in step S601 without requesting confirmation after the connection between the digital camera 100 and the mobile phone 200 is completed in step S610 illustrated in FIG. 6. This example may be modified in such a manner that the digital camera 100 displays the screen 314 illustrated in FIG. 3A, instead of immediately transmitting the image. Displaying the screen 314 illustrated in FIG. 3A to cause the user to confirm the image in this manner can prevent the user from transmitting the image incorrectly selected with a touch error. Further, the digital camera 100 displays the image displayed during the single-reproduction on the screen 314 without changing the image therefrom, which can omit at least the procedure for selecting the image like the multi-reproduction.

Further, the above-described exemplary embodiments have been described based on the example in which the digital camera 100 switches the operation after the connection is established based on the state of the reproduction mode of the digital camera 100. This example may be modified in such a manner that the digital camera 100 switches this operation based on, for example, the number of images displayed on the display unit 106 of the digital camera 100. For example, the digital camera 100 may be configured to transfer the focused image if the number of images displayed on the display unit 106 of the digital camera 100 is three or smaller, and prompt the user to select the image(s) if the number of images is larger than three.

In step S715 illustrated in FIG. 7 in the first exemplary embodiment, the digital camera 100 may return to the screen displayed when the digital camera 100 has been subjected to the NFC touch, like the screen 330 illustrated in FIG. 3C, after disconnecting the wireless LAN connection. This return allows the user to smoothly continue the operation that the user has been performing before transmitting the image(s) via the wireless LAN.

The first exemplary embodiment has been described assuming that powering on the digital camera 100 triggers the start of the flowchart illustrated in FIG. 8, but the digital camera 100 may be configured to wirelessly connect to the mobile phone 200 even when the digital camera 100 is subjected to the NFC touch while being powered off. Assume that, in the case where the digital camera 100 is subjected to the NFC touch while being powered off, the user can perform a similar operation to the operation when the wireless LAN connection is established from the wireless LAN menu, after completion of the connection via the wireless LAN. This configuration allows the user to connect the digital camera 100 to the mobile phone 200, and to select and transmit the image(s) even from such a state that the digital camera 100 is powered off.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-165971, filed Aug. 18, 2014, which is hereby incorporated by reference herein in its entirety.

The invention claimed is:

1. A communication apparatus comprising:

a first communication unit configured to communicate with an external apparatus;

a second communication unit configured to communicate with the external apparatus, a communication speed of the second communication unit being less than a communication speed of the first communication unit; and a control unit configured to control the first communication unit to start establishing of communication with the external apparatus in a case where the second communication unit shares a communication parameter with the external apparatus, wherein the communication parameter is used by the first communication unit for establishing the communication with the external apparatus;

wherein the control unit selects from among a plurality of display modes including a single-display mode of displaying a single content recorded in the recording medium on a single screen of a display unit, and a multi-display mode of simultaneously displaying a plurality of contents recorded in the recording medium on the single screen of the display unit, wherein the control unit determines a display mode in a case where the second communication unit shares the communication parameter with the external apparatus;

wherein, if a display mode in a case where the second communication unit shares the communication parameter with the external apparatus is the multi-display mode, the control unit displays the plurality of contents recorded in the recording medium on the single screen of the display unit and receives a selection of a transmission target and an instruction for starting transmission after establishment of the communication with the external apparatus by the first communication unit, and wherein, if a display mode in a case where the second communication unit shares the communication parameter with the external apparatus is the single-display mode, the control unit performs control in such a manner that the communication apparatus transmits the content displayed in the single-display mode to the external apparatus via the communication unit without receiving a selection of the transmission target and an instruction for starting transmission after the establishment of the communication with the external apparatus by the first communication unit.

2. The communication apparatus according to claim 1, wherein, if the second communication unit shares the communication parameter with the external apparatus in the single-display mode, the control unit performs control to the display unit to display a screen indicating that the transmission of the content displayed in the single-display mode is in progress after the establishment of the communication with the external apparatus by the first communication unit.

3. The communication apparatus according to claim 1, wherein, if the communication unit starts establishment of the communication with the external apparatus in the multi-display mode, the communication unit transmits one or more contents selected after the establishment of the communication with the external apparatus to the external apparatus.

4. The communication apparatus according to claim 3, wherein, if the communication unit starts establishment of the communication with the external apparatus in the multi-display mode, the control unit performs control in such a manner that the communication apparatus shifts the screen to a screen for selecting the one or more content(s) from the plurality of contents recorded in the recording medium after the establishment of the communication with the external apparatus.

5. The communication apparatus according to claim 1, wherein, if transmission of the content to the external apparatus by the first communication unit is completed, the first communication unit disconnects the communication with the external apparatus.

6. The communication apparatus according to claim 5, wherein, if the transmission of the content to the external apparatus by the communication unit is stopped due to an error, the communication unit does not disconnect the communication with the external apparatus.

7. The communication apparatus according to claim 1, wherein, if transmission of the content to the external apparatus via the communication which is established by the first communication unit in response to sharing of the communication parameter with the external apparatus by the second communication unit in the single-display mode is completed, the first communication unit disconnects the communication with the external apparatus, and wherein, if transmission of the content to the external apparatus via the communication which is established by the first communication unit in response to sharing of the communication parameter with the external apparatus by the second communication unit in the multi-display mode is completed, the first communication unit does not disconnect the communication with the external apparatus.

8. The communication apparatus according to claim 7, wherein, if the transmission of the content to the external apparatus via the communication started in the single-display mode is stopped due to an error, the communication unit does not disconnect the communication with the external apparatus.

9. The communication apparatus according to claim 1, further comprising a close proximity wireless communication unit different from the communication unit and configured to be able to communicate with the external apparatus via close proximity wireless communication, wherein the communication unit starts establishment of the communication with the external apparatus with use of a communication parameter by sharing the communication parameter with the external apparatus with use of the close proximity wireless communication unit.

10. The communication apparatus according to claim 9, wherein the communication unit starts creating a network for communicating with the external apparatus with use of the communication parameter by sharing the communication parameter with the external apparatus with use of the close proximity wireless communication unit.

11. The communication apparatus according to claim 9, wherein the control unit determines whether the communication by the communication unit is the communication started in the single-display mode or the communication started in the multi-display mode, based on the display mode when the communication parameter is shared with the external apparatus with use of the close proximity wireless communication unit.

12. The communication apparatus according to claim 9, wherein the close proximity wireless communication unit is NFC unit, and wherein the communication unit is a wireless LAN unit.

13. The communication apparatus according to claim 1, further comprising an imaging unit configured to image an object to generate image data, wherein the control unit performs control in such a manner that the communication apparatus records the image data generated by the imaging unit into the recording medium as the content.

14. The communication apparatus according to claim 1, further comprising a reception unit configured to receive an input of a communication parameter from a user, wherein, if the communication unit communicates with the external apparatus with use of the communication parameter input by the user, the communication unit maintains the communication with the external apparatus even after transmission of the content is completed.

15. A method for controlling a communication apparatus having a plurality of display modes including a single-display mode of displaying a single content recorded in a recording medium on a single screen of a display unit, and a multi-display mode of simultaneously displaying a plurality of contents recorded in the recording medium on the single screen of the display unit, the method comprising:

communicating with an external apparatus via a first communication unit;

communicating with the external apparatus via a second communication unit, a communication speed of the second communication unit being less than a communication speed of the first communication unit;

acquiring a plurality of contents from the recording medium;

controlling the first communication unit to start establishing of communication with the external apparatus in a case where the second communication unit shares a communication parameter with the external apparatus, wherein the communication parameter is used by the first communication unit for establishing the communication with the external apparatus; and determining a display mode in a case where the second communication unit shares the communication parameter with the external apparatus;

wherein, if a display mode in a case where the second communication unit shares the communication parameter with the external apparatus is the multi-display mode, the plurality of contents recorded in the recording medium is displayed on the single screen of the display unit and a selection of a transmission target and an instruction for starting transmission are received after establishment of communication with the external apparatus by the first communication unit, and wherein, if a display mode in a case where the second communication unit shares the communication parameter with the external apparatus is the single-display mode, control is performed in such a manner that the communication apparatus transmits the content displayed in the single-display mode to the external apparatus via the communication unit without receiving a selection of the transmission target and an instruction for starting transmission after the establishment of the communication with the external apparatus by the first communication unit.

16. A non-transitory computer-readable storage medium which stores a program for causing a communication apparatus to perform a method, the communication apparatus having a plurality of display modes including a single-display mode of displaying a single content on a single screen of a display unit, and a multi-display mode of simultaneously displaying a plurality of contents on the single screen of the display unit, the method comprising:

communicating with an external apparatus via a first communication unit;

communicating with the external apparatus via a second communication unit, a communication speed of the second communication unit being less than a communication speed of the first communication unit;

acquiring a plurality of contents from a recording medium; and controlling the first communication unit to start establishing of communication with the external apparatus in a case where the second communication unit shares a communication parameter with the external apparatus, wherein the communication parameter is used by the first communication unit for establishing the communication with the external apparatus;

determining a display mode in a case where the second communication unit shares the communication parameter with the external apparatus;

wherein, if a display mode in a case where the second communication unit shares the communication parameter with the external apparatus is the multi-display mode, the plurality of contents recorded in the recording medium is displayed on the single screen of the display unit and a selection of a transmission target and an instruction for starting transmission are received after establishment of communication with the external apparatus by the first communication unit, and wherein, if a display mode in a case where the second communication unit shares the communication parameter with the external apparatus is the single-display mode, control is performed in such a manner that the communication apparatus transmits the content displayed in the single-display mode to the external apparatus via the communication unit without receiving a selection of the transmission target and an instruction for starting transmission after the establishment of the communication with the external apparatus by the first communication unit.

17. The communication apparatus according to claim 1, wherein the control unit stores a display mode in a case where the second communication unit shares the communication parameter, wherein, if the first communication unit establishes the communication in response to sharing of the communication parameter, the control unit controls the first communication unit to transmit the stored display mode.

18. The communication apparatus according to claim 1, wherein, in response to sharing of the communication parameter, the first communication unit starts transmitting of a beacon using the shared communication parameter and waits for a connection request from the external apparatus.

19. The communication apparatus according to claim 1, wherein, in a case where the communication which is started by the first communication unit in response to sharing of the communication parameter with the external apparatus by the second communication unit in the single-display mode is disconnected, the control unit controls the display unit to display a single content recorded in the recording medium on the single screen, and wherein, in a case where the communication which is started by the first communication unit in response to sharing of the communication parameter with the external apparatus by the second communication unit in the multi-display mode is disconnected, the control unit controls the display unit to display and a multi-display mode of simultaneously displaying a plurality of contents recorded in the recording medium on the single screen.

* * * * *